(12) United States Patent
Kosaka et al.

US011216779B2

(10) Patent No.: US 11,216,779 B2
(45) Date of Patent: Jan. 4, 2022

(54) ARTICLE MANAGEMENT SUPPORT APPARATUS, ARTICLE MANAGEMENT SUPPORT SYSTEM, AND ARTICLE MANAGEMENT SUPPORT METHOD

(71) Applicant: HITACHI TRANSPORT SYSTEM, LTD., Tokyo (JP)

(72) Inventors: Tadayoshi Kosaka, Tokyo (JP); Toshiko Matsumoto, Tokyo (JP); Koji Ara, Tokyo (JP); Issei Suemitsu, Tokyo (JP); Tetsuhiro Horita, Tokyo (JP)

(73) Assignee: HITACHI TRANSPORT SYSTEM, LTD., Tokyo (JP)

( * ) Notice: Subject to any disclaimer, the term of this patent is extended or adjusted under 35 U.S.C. 154(b) by 238 days.

(21) Appl. No.: 16/603,472

(22) PCT Filed: Apr. 12, 2017

(86) PCT No.: PCT/JP2017/014908
§ 371 (c)(1),
(2) Date: Oct. 7, 2019

(87) PCT Pub. No.: WO2018/189820
PCT Pub. Date: Oct. 18, 2018

(65) Prior Publication Data
US 2020/0042932 A1 Feb. 6, 2020

(51) Int. Cl.
*G06Q 10/08* (2012.01)
*G06K 7/10* (2006.01)
*G06K 7/14* (2006.01)

(52) U.S. Cl.
CPC ....... *G06Q 10/087* (2013.01); *G06K 7/10722* (2013.01); *G06K 7/1413* (2013.01)

(58) Field of Classification Search
CPC .................................................. G06Q 10/087
See application file for complete search history.

(56) References Cited

U.S. PATENT DOCUMENTS 8,694,154 B2   4/2014  Winkler
9,632,313 B1*  4/2017  Madan ................... G06Q 10/08
(Continued)

FOREIGN PATENT DOCUMENTS

EP    2876059 A1    5/2015
JP    2001-233418 A  8/2001
(Continued)

OTHER PUBLICATIONS

Extended European Search Report dated Oct. 20, 2020 for European Patent Application No. 17905165.1.
(Continued)

*Primary Examiner* — Florian M Zeender
*Assistant Examiner* — Vanessa Deligi
(74) *Attorney, Agent, or Firm* — Volpe Koenig

(57) ABSTRACT

An article management support apparatus sets coordinates indicating a position of an observation point and an observation direction from the observation point in a space including article storage spaces, acquires coordinates of an article picking opening of an article storage space within a predetermined range with respect to the position of the observation point and the observation direction, acquires information on the article stored in the article storage space corresponding to the article picking opening for which the coordinates are acquired, transforms the acquired coordinates of the article picking opening into coordinates on an image seen in the observation direction from the position of the observation point, generates an image for displaying the information on the article stored in the article storage space corresponding to the article picking opening for which the coordinates are acquired in association with a position of the transformed coordinates, and displays the generated image.

12 Claims, 26 Drawing Sheets

(56) References Cited

U.S. PATENT DOCUMENTS

| | | | |
|---|---|---|---|
| 9,836,651 B2 | 12/2017 | Matoba et al. | |
| 10,122,995 B2* | 11/2018 | Rublee | G06K 9/6215 |
| 2002/0116298 A1* | 8/2002 | Kamon | G06Q 30/0643 |
| | | | 705/27.2 |
| 2017/0069135 A1* | 3/2017 | Komaki | G06K 9/00536 |
| 2018/0068255 A1* | 3/2018 | Hance | G06Q 10/0838 |

FOREIGN PATENT DOCUMENTS

| | | |
|---|---|---|
| JP | 2003-212316 A | 7/2003 |
| JP | 2010-173789 A | 8/2010 |
| JP | 2014-043353 A | 3/2014 |
| JP | 2015-048171 A | 3/2015 |
| JP | 6008832 B2 | 10/2016 |
| JP | 2016-188123 A | 11/2016 |
| JP | 2016188123 A * | 11/2016 |

OTHER PUBLICATIONS

International Search Report, PCT/JP2017/014908, dated Jul. 11, 2017, 2 pgs.

* cited by examiner

DIRECTION OF SHIPPING EXIT 12

| ROW (501) | LINE (502) | LEVEL (503) | COLUMN (504) | ARTICLE ID (601) | SHIPPING FREQUENCY DIVISION (A~C) (602) |
|---|---|---|---|---|---|
| 0 | 0 | 0 | 0 | 19930621 | A |
| 0 | 0 | 0 | 1 | 19940712 | C |
| 0 | 0 | 0 | 2 | 19950315 | C |
| 0 | 0 | 0 | 3 | 19950604 | B |
| 0 | 0 | 1 | 0 | 19960611 | A |
| 0 | 0 | 1 | 1 | 20080517 | B |
| ⋮ | ⋮ | ⋮ | ⋮ | | ⋮ |
| 0 | 1 | 0 | 0 | 19960317 | C |
| ⋮ | ⋮ | ⋮ | ⋮ | | ⋮ |
| 1 | 0 | 0 | 0 | 20110411 | A |
| ⋮ | ⋮ | ⋮ | ⋮ | | ⋮ |

*FIG. 6*

| MARKER ID (2601) | COORDINATE X (2602) | COORDINATE Y (2603) | COORDINATE Z (2604) | DIRECTION (2605) | CHARACTERISTIC CODE (2606) |
|---|---|---|---|---|---|
| #1 | 2100 | 0 | 1500 | N | 4a3df3e3c1b3··· |
| #2 | 2600 | 0 | 1500 | W | 014f3edb1a1e··· |
| #3 | 2100 | 4500 | 1500 | S | 897a5d8f4cce··· |
| ⋮ | ⋮ | ⋮ | ⋮ | ⋮ | ⋮ |

*FIG. 26*

ARTICLE MANAGEMENT SUPPORT APPARATUS, ARTICLE MANAGEMENT SUPPORT SYSTEM, AND ARTICLE MANAGEMENT SUPPORT METHOD

BACKGROUND OF THE INVENTION

This invention relates to an article management support technology of displaying information on an article stored in a storage rack.

In JP 2003-212316 A, there is disclosed an assignment support apparatus for moving an article having a high shipping frequency to a rack position close to a shipping exit, and moving an article having a low shipping frequency to a rack position far from the shipping exit, in order to increase the efficiency of picking work that picks up an ordered article from a storage rack.

Further, in JP 2003-212316 A, there is also disclosed an article assignment support apparatus configured to display shipping frequencies in different colors on a plan view of a warehouse.

Further, in JP 2010-173789 A, there is disclosed a picking work record display system configured to display storage spaces, which are divisions of a storage rack, in different colors depending on a shipping frequency.

SUMMARY OF THE INVENTION

In order to increase the efficiency of picking work, location management work of moving an article having a high shipping frequency to a space close to a shipping exit has hitherto been performed. There is proposed a technique of calculating a specific work instruction as to which article is to be moved to which space by using automatic assignment software disclosed in JP 2003-212316 A. However, in an actual workplace, the solution obtained by calculation software is not always an optimum solution because there may be some restrictions. For example, a temporary storage space for cardboard boxes or packing materials, which was used at the time of warehousing, may be temporarily secured, an article stored in the storage rack may stick out, or an article is required to be placed at the bottom due to its weight or size. Thus, there is a demand for a system in which an administrator checks the result of calculation software, or devises or sets an instruction for a storage space that requires some action while checking the situation of the workplace.

However, in JP 2003-212316 A, respective storage spaces, which are a plurality of divisions of a storage rack, store a plurality of types of articles with the same shipping frequency, and thus, when the shipping frequency of each article has changed due to elapse of time, the shipping frequency for each storage space that has correctly reflected the current situation cannot be displayed. Thus, there is a problem in that, at the time of location management, the administrator has a difficulty in grasping the current situation of the shipping frequency of each storage space and giving a location instruction based on the current situation.

Further, in JP 2010-173789 A, a list of shipping frequency coefficients can be displayed for respective storage spaces, which are a plurality of divisions of one storage rack, but there is a problem in that the technology of JP 2010-173789 A does not have a function of checking pieces of information on a plurality of storage racks, which are arranged in array, at the same time, or immediately checking the situation by superimposing information onto a storage rack being viewed at the workplace.

The picking work and inventory work other than location management also have a problem in that it is difficult to display pieces of information for respective storage spaces, which are a plurality of divisions of one storage rack, and a worker has a difficulty in grasping the current situation and performing work based on the current situation, and a problem in that there is no function of checking pieces of information on a plurality of storage racks, which are arranged in array, at the same time, or immediately checking the situation by superimposing information onto a storage rack being viewed at the workplace.

This application includes a plurality of means to solve the foregoing problems. An example is as follows: an article management support apparatus, comprising: an observation point coordinate/observation direction setting module configured to set coordinates indicating a position of an observation point and an observation direction from the observation point in a space including a plurality of article storage spaces each for storing an article; an article picking opening coordinate extraction module configured to acquire coordinates of an article picking opening of an article storage space within a predetermined range with respect to the position of the observation point and the observation direction; an article information collection module configured to acquire information on the article stored in the article storage space corresponding to the article picking opening for which the coordinates are acquired; a coordinate transformation module configured to transform the acquired coordinates of the article picking opening into coordinates on an image seen in the observation direction with respect to the position of the observation point; a first rendering module configured to generate an image for displaying the information on the article stored in the article storage space corresponding to the article picking opening for which the coordinates are acquired in association with a position of the transformed coordinates; and a display unit configured to display the image generated by the first rendering module.

According to at least one embodiment of this invention, there is provided an effect of being able to display a list of pieces of information on a plurality of types of articles stored in respective storage spaces, which are a plurality of divisions of a storage rack, to thereby enable a worker to grasp the current situation of each storage space, and perform work or give a work instruction based on the current situation at the time of location management work, inventory work, or picking work, for example.

Further, according to at least one embodiment of this invention, there is provided an effect of being able to check pieces of information on respective storage spaces within a plurality of storage racks, which are arranged in array, at the same time, and to immediately check the situation by superimposing information onto a storage rack being viewed at the workplace.

Problems, configurations, and effects other than those described above become more apparent from the following descriptions of embodiments of this invention.

BRIEF DESCRIPTION OF THE DRAWINGS

FIG. 6 is an explanatory table for showing an example of an article ID and article information on an article stored in an article information DB in the first embodiment of this invention.

FIG. 26 is an explanatory table for showing an example of details of a marker DB held by the article information display apparatus according to the second embodiment of this invention.

DETAILED DESCRIPTION OF THE PREFERRED EMBODIMENTS

A description is now given of embodiments of this invention with reference to the drawings.

First Embodiment

A first embodiment of this invention relates to a display apparatus configured to, in order to increase the efficiency of picking work of picking up an article stored in a storage rack, display the magnitude of a shipping frequency of each storage space on a screen of a tablet or personal computer, when performing location management work of placing an article having a high shipping frequency in a space close to a shipping exit (namely, article delivery exit) and an article having a low shipping frequency in a space far from the shipping exit.

Figure 3:
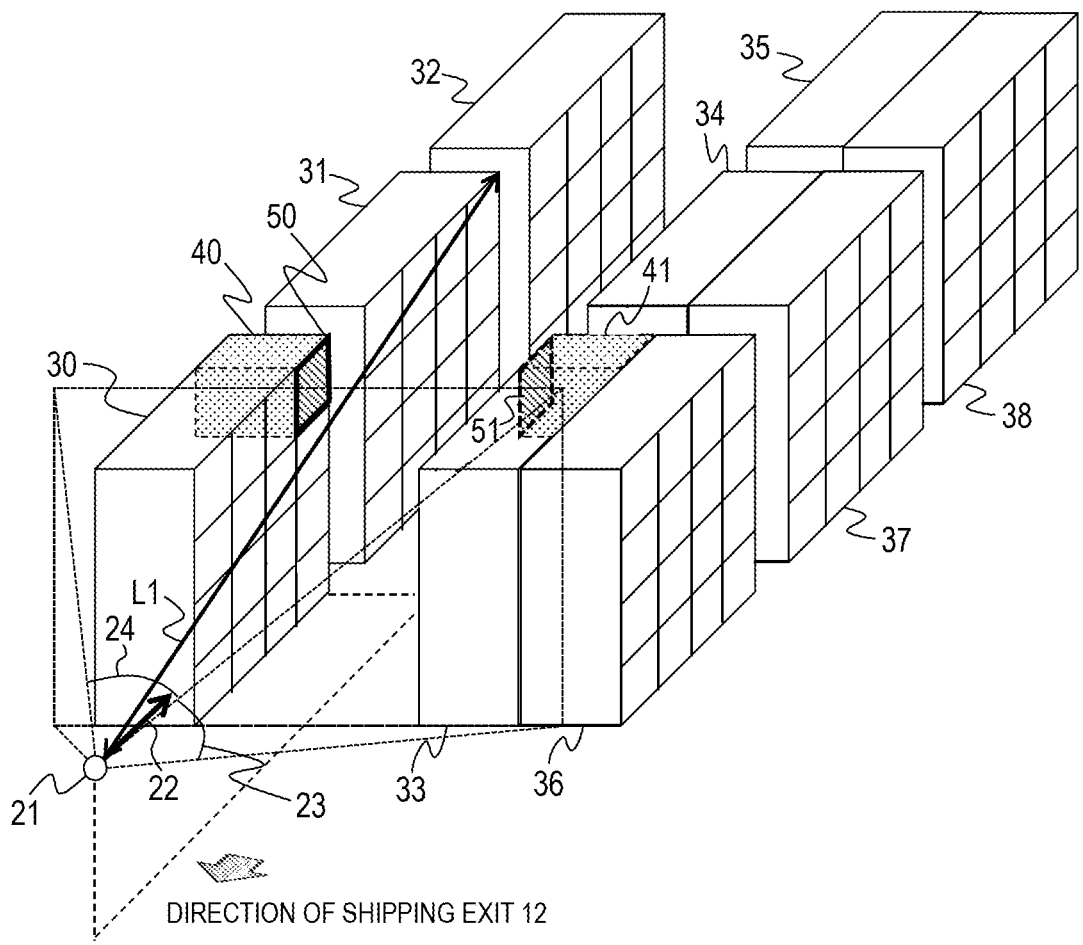
FIG. 3 is a conceptual diagram of the first embodiment of this invention.
Figure 3:
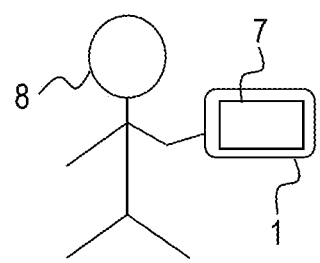

FIG. 3 is a conceptual diagram of the first embodiment of this invention.

In a warehouse to which the first embodiment is to be applied, a storage rack 30 including a storage space 40 for storing an article and an article picking opening 50 set in the storage space 40 and a storage rack 33 including a storage space 41 for storing an article and an article picking opening 51 set in the storage space 41 are arranged in parallel in such a direction that both the article picking openings are opposed to each other. An article information display apparatus 1 according to the first embodiment is configured to display article information on an article to be observed by superimposing the article information onto an article picking opening displayed on a display unit 7. The article to be observed is stored in a storage space within a range of a predetermined perpendicular angle of view 23 and a predetermined horizontal angle of view 24 from an observation point 21, which is located at a position away from those two storage racks by a predetermined distance, with respect to an observation direction 22 (hereinafter also described as "line-of-sight direction").

In the warehouse illustrated in FIG. 3, storage racks 30 to 38 including the above-mentioned storage racks 30 and 33 are placed. In FIG. 3, only one storage space and only one article picking opening are illustrated for one storage rack, but in actuality, there are a plurality of storage spaces and article picking openings in the same storage rack. Further, in the example illustrated in FIG. 3, it is assumed that a worker 8 who operates the article information display apparatus 1 is present at another location, for example, an office at a location far from a warehouse to be observed, and the observation point 21 is virtually set in the article information display apparatus 1. In other words, in the first embodiment, a camera and other devices are not required to be installed at the observation point 21.

In the example of FIG. 3, a shipping exit 12 is located in a bottom left direction. All the articles are shipped via the shipping exit 12, and thus in general, an article having a high shipping frequency is placed close to the shipping exit so that the movement distance of the worker 8, who performs shipping work, becomes shorter and the work is made to be more efficient.

Figure 1:
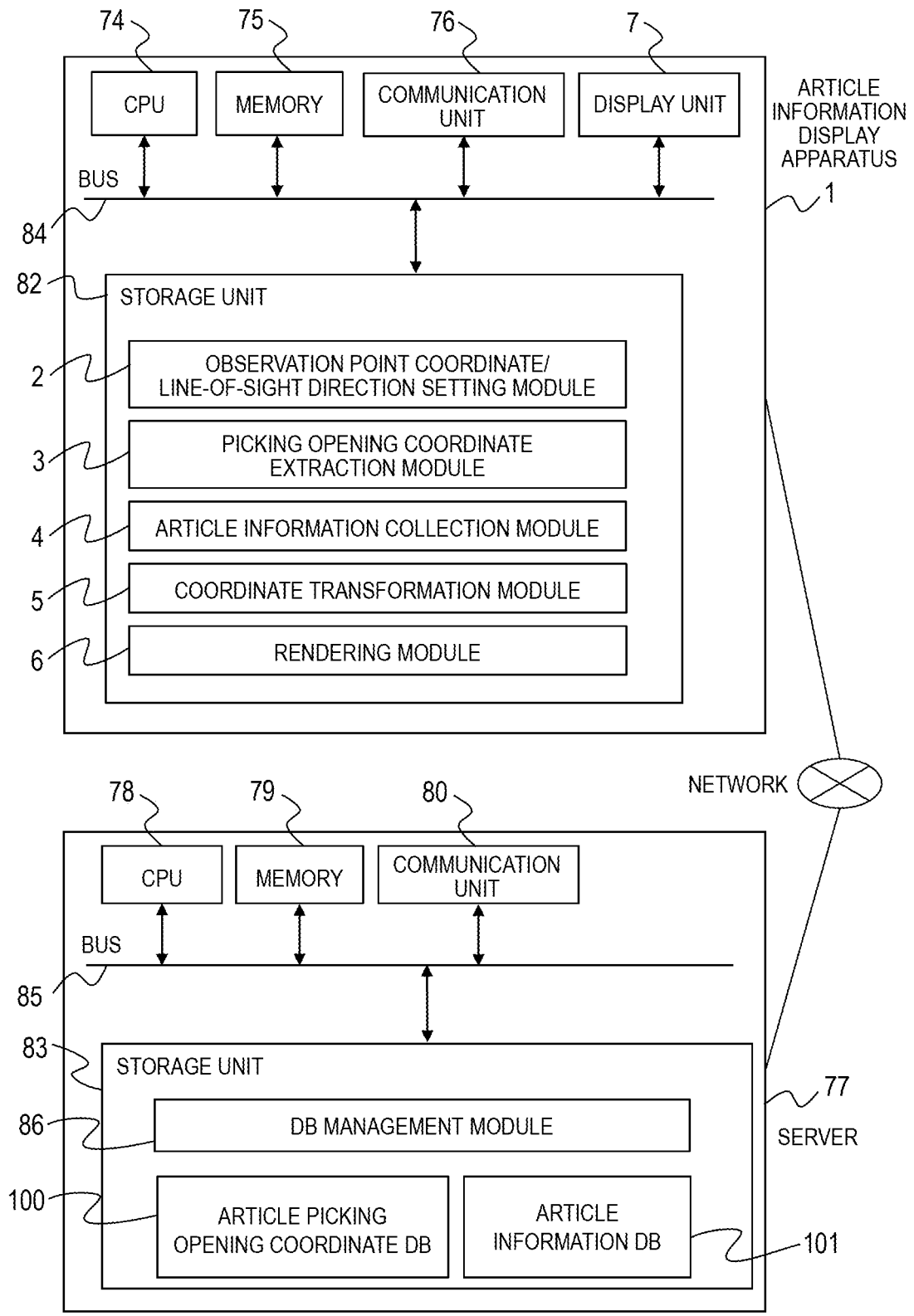
FIG. 1 is a block diagram for illustrating an example of a functional configuration of an article information display apparatus according to a first embodiment of this invention.

FIG. 1 is a block diagram for illustrating an example of a functional configuration of the article information display apparatus 1 according to the first embodiment of this invention.

The article information display apparatus 1 is an apparatus configured to support management of an article by displaying article information, and includes a central processing unit (CPU) 74, a memory 75, a communication unit 76, a display unit 7, and a storage unit 82, and those components are coupled to one another via a bus 84. The storage unit 82 is a storage such as a hard disk drive or an SSD. The CPU 74 loads a program code stored in the storage unit 82 into the memory 75, and executes the program code. In the example of FIG. 1, program codes for implementing the functions of an observation point coordinate/line-of-sight direction setting module 2, a picking opening coordinate extraction module 3, an article information collection module 4, a coordinate transformation module 5, and a rendering module 6 are stored in the storage unit 82. In the following description, processing to be executed by each module described above is executed by the CPU 74 in accordance with the program code in actuality. The article information display apparatus 1 exchanges information with a server 77 outside the article information display apparatus 1 through the communication unit 76.

Meanwhile, the server 77 includes a CPU 78, a memory 79, a communication unit 80, and a storage unit 83, and those components are coupled to one another via a bus 85. The storage unit 83 is a storage such as a hard disk drive or an SSD. The CPU 78 loads a database (DB) management module 86 stored as a program code in the storage unit 83 into the memory 79, and executes the program code. The storage unit 83 further stores an article picking opening coordinate DB 100 and an article information DB 101. The server 77 exchanges information with the article information display apparatus 1 through the communication unit 80. Now, a description is given of an operation of each component of FIG. 1 with reference to the flow chart of FIG. 2.

Figure 2:
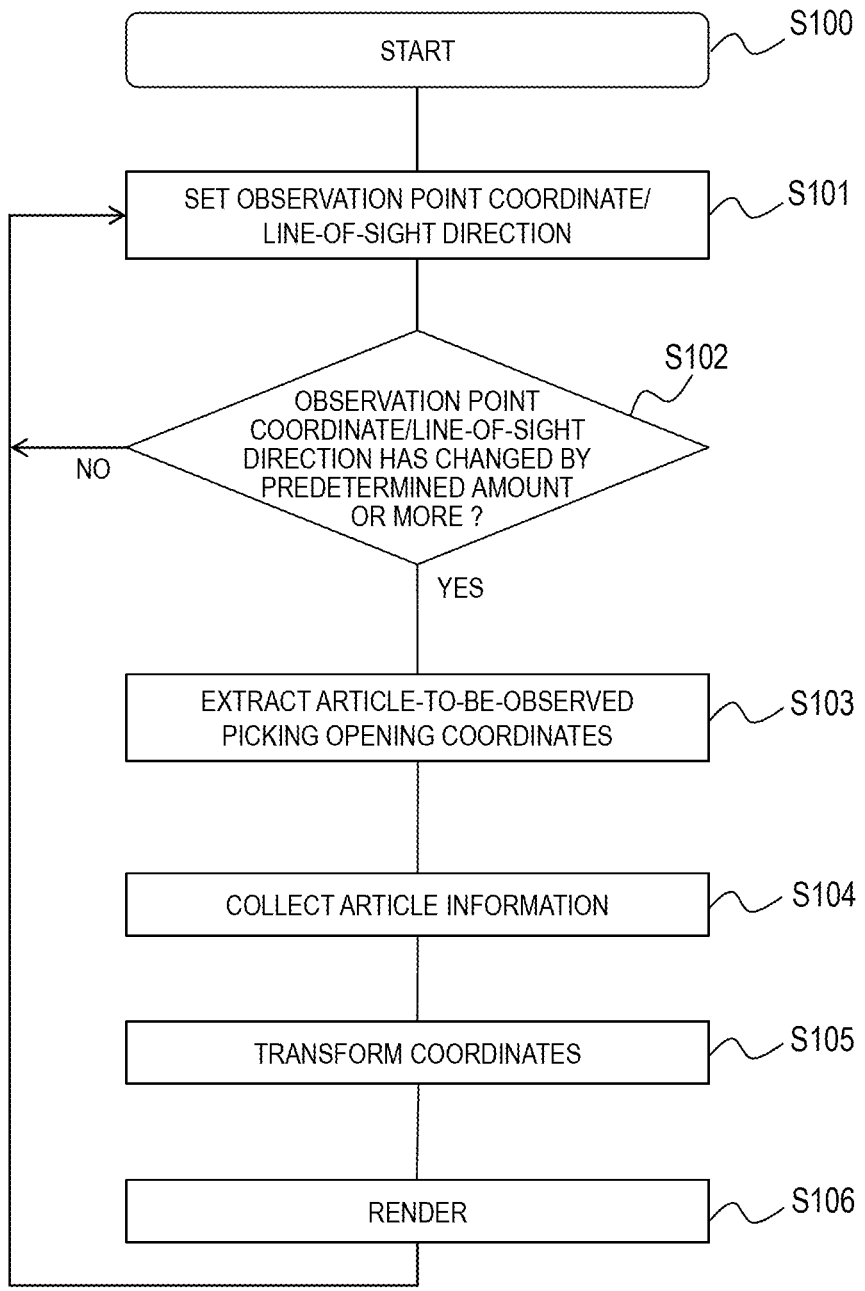
FIG. 2 is a flow chart for illustrating processing to be executed by the article information display apparatus according to the first embodiment of this invention.

FIG. 2 is a flow chart for illustrating processing to be executed by the article information display apparatus 1 according to the first embodiment of this invention.

When the processing is started (Step S100), an observation point coordinate/line-of-sight direction setting sequence (Step S101) is executed. This is a sequence to be executed by the observation point coordinate/line-of-sight direction setting module 2 to set the coordinates and line-of-sight direction of the observation point 21. For example, the coordinates or direction may be input by a numerical value through a keyboard (not shown) of the article information display apparatus 1, or may be input through a button on a GUI.

Figure 7:
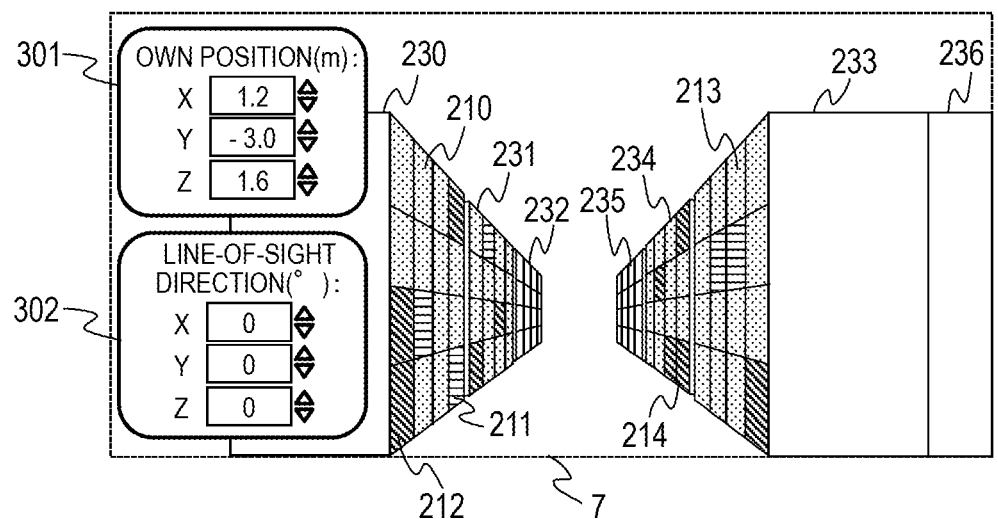
FIG. 7 is an explanatory diagram for illustrating an example of a screen to be displayed by a display unit of the article information display apparatus according to the first embodiment of this invention.

FIG. 7 is an explanatory diagram for illustrating an example of a screen to be displayed by the display unit 7 of the article information display apparatus 1 according to the first embodiment of this invention.

In FIG. 7, a display screen corresponding to the previously set own position (namely, position of observation point 21) and line-of-sight direction (namely, observation direction 22) is displayed, and a GUI window 301 for setting the own position and a GUI window 302 for setting the line-of-sight direction are superimposed onto the display screen for display. For example, the worker 8 can operate the GUI window 301 for setting the own position to move the position of the observation point 21 to the position of the viewpoint of the worker 8, and operate the GUI window 302 for setting the line-of-sight direction to change the observation direction 22 so that the observation direction 22 matches the line-of-sight direction of the worker 8. Details of the display screen of FIG. 7 are described later.

In a sequence of Step S102, the observation point coordinate/line-of-sight direction setting module 2 compares the values of the observation point coordinates and line-of-sight direction set in Step S101 with respective previous values to determine whether the amount of change is equal to or larger than a predetermined amount. When the amount of change is equal to or larger than the predetermined amount, the processing proceeds to an article-to-be-observed picking opening coordinate extraction sequence (Step S103). When there is no change equal to or larger than the predetermined amount, the processing returns to the processing of Step S101 again.

The article-to-be-observed picking opening coordinate extraction sequence (Step S103) corresponds to an operation sequence to be executed by the picking opening coordinate extraction module 3. The picking opening coordinate extraction module 3 extracts, as the article to be observed, from among all the articles stored in the warehouse, an article stored in a storage space whose article picking opening coordinates are present within a range of a distance L1 from the coordinates of the observation point 21 and inside the predetermined perpendicular angle of view 23 and horizontal angle of view 24 in a case of observation from the coordinates of the observation point 21 in the observation direction 22. Further, the picking opening coordinate extraction module 3 extracts the article picking opening coordinates of a storage space in which the article to be observed is stored. The picking opening coordinate extraction module 3 limits the observation target by the above-mentioned sequence to obtain an effect of increasing the speed of subsequent processing. In the first embodiment, the article to be observed is limited based on the angle of view and distance, but the article to be observed may be limited only based on the angle of view or only based on the distance. For example, when the article to be observed is limited only based on the distance and the article to be observed having an angle of view larger than the above-mentioned angle of view is selected, the article to be observed is not required to be selected again when the line-of-sight direction is subsequently moved toward the direction of that article to be observed, resulting in an effect of increasing the speed of processing.

The picking opening coordinate extraction module 3 calculates a coordinate range for extracting the article to be observed as described above, and then makes an inquiry to the server 77 through the communication unit 76. The DB management module 86 of the server 77, which has received this inquiry, extracts a list of article picking opening coordinates within the corresponding coordinate range from the article picking opening coordinate DB 100, and notifies the article information display apparatus 1 of the list through the communication unit 80.

Figure 4:
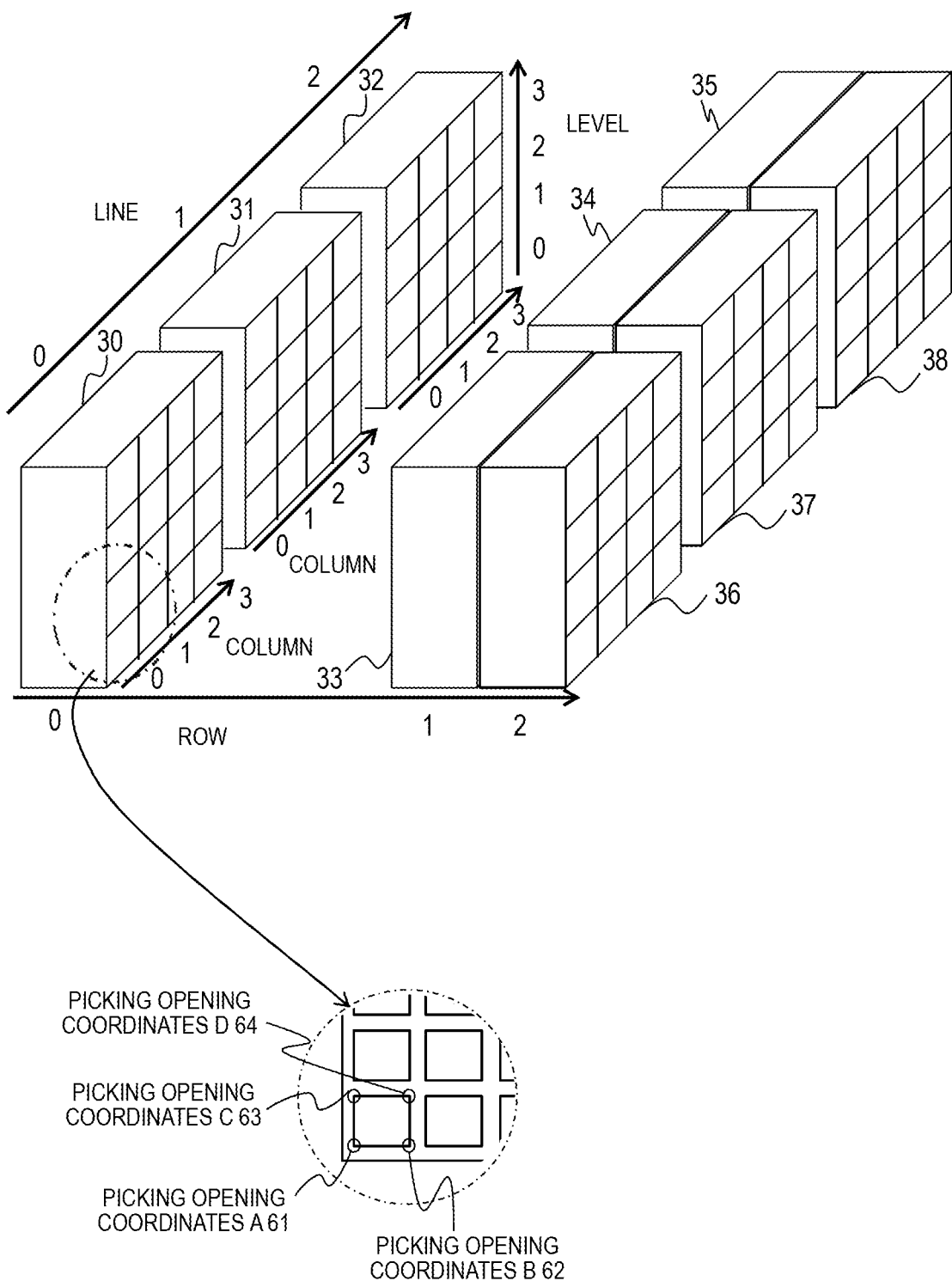
FIG. 4 is an explanatory diagram for illustrating arrangement of storage spaces in a warehouse in the first embodiment of this invention.

FIG. 4 is an explanatory diagram for illustrating arrangement of storage spaces in the warehouse in the first embodiment of this invention.

Each storage space can be identified by a combination of numbers for identifying four items, namely, "row" being a number assigned sequentially to each of the storage racks 30 to 38, which are arranged in a direction of sandwiching a road as illustrated in FIG. 4, "line" being a number assigned sequentially to each of the racks, which are arranged in a direction orthogonal to the row, "level" meaning a layer in an upward-downward direction, "column" being a division of each rack in the line direction. In the example of FIG. 4, a total of 9 racks formed of "3 lines×3 rows" are arranged, and each rack is identified by a combination of line numbers "0" to "2" and row numbers "0" to "2". Further, each rack includes a total of 16 storage spaces formed of "4 levels×4 columns", and each rack is identified by a combination of level numbers "0" to "3" and column numbers "0" to "3".

The article picking opening coordinates are set for four corners of each storage space. For example, picking opening coordinates A61 being coordinates at the bottom left corner of each storage space, picking opening coordinates B62 being coordinates at the bottom right corner of each storage space, picking opening coordinates C63 being coordinates at the top left corner of each storage space, and picking opening coordinates D64 being coordinates at the top right corner of each storage space are set.

Figure 5:
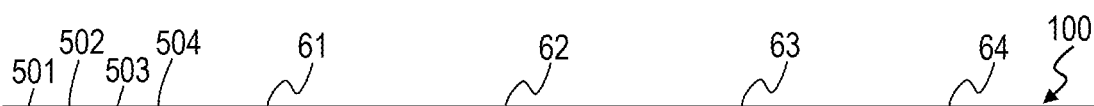
FIG. 5 is an explanatory table for showing an example of coordinate information stored in an article picking opening coordinate DB in the first embodiment of this invention.

FIG. 5 is an explanatory table for showing an example of coordinate information stored in the article picking opening coordinate DB 100 in the first embodiment of this invention.

In the example of FIG. 5, four sets of coordinates from the picking opening coordinates A61 to the picking opening coordinates D64 are stored for each storage space identified by a combination of numbers of a row 501, a line 502, a level 503, and a column 504.

In FIG. 5, four sets of article picking opening coordinates are set for each storage space. However, only one point out of those points may be stored in the article picking opening coordinate DB 100 as information, and the other three points may be calculated from information on the size of the article picking opening. Alternatively, when the sizes of the row, line, level, and column are known, the article picking opening coordinates of each storage space may be calculated from the numbers of the row, line, level, and column.

An article information collection sequence (Step S104) corresponds to an operation sequence to be executed by the article information collection module 4, and is an operation of extracting article information on the article to be observed, which is extracted in Step S103, from the article information DB 101. The article information collection module 4 inquires the server 77 of a list of numbers of the relevant row, line, level, and column through the communication unit 76. The DB management module 86 of the server 77, which has received this inquiry, extracts a list of pieces of article information of the relevant row, line, level, and column from the article information DB 101, and notifies the article information display apparatus 1 of that list through the communication unit 80. In the first embodiment, the article information display apparatus 1 acquires a list of picking opening coordinates of the article to be observed in Step S103, and then acquires a list of pieces of article information of the corresponding coordinates in Step S104. However, in Step S103, the lists of picking opening coordinates and pieces of article information of the article to be observed may be acquired at the same time.

FIG. 6 is an explanatory table for showing an example of an article ID and article information on an article stored in the article information DB 101 in the first embodiment of this invention.

In FIG. 6, there is illustrated an example of an article ID 601 for identifying an article stored for each storage space identified by a combination of numbers of the row 501, line 502, level 503, and column 504, and a shipping frequency division 602 being article information on the stored article.

In the first embodiment, values obtained by classifying a shipping frequency at which each article is shipped per day into shipping frequency divisions A to C are set as the article information. For example, a first threshold value of the shipping frequency and a second threshold value lower than the first threshold value may be set, and the shipping frequency divisions 602 of an article having a shipping frequency larger than the first threshold value, an article having a shipping frequency between the first threshold value and the second threshold value, and an article having a shipping frequency smaller than the second threshold value may be set as A, B, and C, respectively.

In other cases, the article information may take the value of the shipping frequency itself, or may be, for example, a storage period (days) for selecting dead stocks, a filling rate indicating an occupancy rate of the volume of each article to the volume of the storage space, a vacant location situation indicating whether each article is stocked by 1/0, or a restocking necessity representing, by multiple levels, a difference between the current number of stocks of each article and the number of stocks that is determined to require restocking. In other cases, an average value of periods required for picking work that picks up an article stored in each article storage space may be set as the article information. Further, the article information may be a combination of pieces of information as described above, or may contain information other than those described above.

The article information as described above is displayed through processing described later, to thereby enable the user (e.g., worker 8 or warehouse administrator) of the article information display apparatus 1 to determine whether the current storage space of each article is appropriate from the perspective of increasing the efficiency of work in the warehouse, and when the current storage space of each article is not appropriate, consider movement (exchange) of the storage space to achieve a more appropriate situation. As described later, the efficiency of work is evaluated by, for example, a movement distance or man-hour of the worker 8.

A coordinate transformation sequence (Step S105) indicates an operation sequence to be executed by the coordinate transformation module 5, and represents a sequence of transforming three-dimensional article picking opening coordinates extracted in Step S103 into two-dimensional coordinates (namely, coordinates of a position at which each article picking opening can be seen on the two-dimensional image representing a scenery that can be seen from the observation point 21 in the line-of-sight direction 22) to be displayed on the display unit 7 of the article information display apparatus 1.

A rendering sequence (Step S106) represents an operation sequence to be executed by the rendering module 6, and is a sequence of rendering the article information acquired in Step S104 in association with the transformed coordinates acquired in Step S105. The rendered information is displayed by the display unit 7.

In the example of the display screen illustrated in FIG. 7, display objects 230 to 236 are displayed in association with the storage racks 30 to 36, respectively. Those objects are graphics rendered by computer graphics (CG) by simulating the shapes and arrangement of the storage racks 30 to 36 supposed to be seen from the observation point 21. Further, among those graphics, article information display objects for displaying article information (shipping frequency division in the first embodiment) are superimposed onto a part corresponding to the article picking opening of a storage rack for display. For example, the server 77 may hold coordinate information indicating the shapes and arrangement of the storage racks 30 to 36, and the rendering module 6 may acquire at least a part of the coordinate information as required, and store the information into the storage unit 82 to execute rendering based on the information.

In the example of FIG. 7, squares with colors assigned to the respective shipping frequency divisions A, B, and C are displayed as the article information display objects 210 to 214. A reference numeral is omitted for other article information display objects, but in the example of FIG. 7, a total of 64 article information display objects are displayed. For example, the administrator of the warehouse can refer to such display to easily grasp in which space an article having a high shipping frequency and an article having a low shipping frequency are stored. Then, it is possible to easily make a determination of switching an article having a low shipping frequency with an article having a high shipping frequency when it is found that the article having a low shipping frequency is stored in a storage space close to the shipping exit 12 (front side in the example of FIG. 7) and the article having a high shipping frequency is stored in a storage space far from the shipping exit 12, for example.

In the first embodiment, a square with a color corresponding to the shipping frequency is displayed as an article information display object, but characters such as "A", "B", and "C" indicating shipping frequency divisions may be displayed, or the square may be displayed not in color but in light and shade. With this, the magnitude of the shipping frequency is easily recognized.

Further, it is assumed that the rendering module 6 in the first embodiment does not intentionally display, among display objects for displaying the selected article information, a display object of an article picking opening, which is present on the back side of a side surface of a storage rack when seen from the observation point 21 in the line-of-sight direction 22, and a display object of an article picking opening, which is present on the back side of another display object. For example, the article picking opening present on the back side of a side surface of a storage rack indicates an article picking opening that is supposed not to be seen by the worker 8 whose viewpoint is at the position of the observation point 21 because his or her line of sight is blocked by the side surface of the storage rack. When the side surface of a display object storage rack of the article picking opening and the display object are transparent, several display objects are displayed in an overlapping manner, and the visibility deteriorates. Thus, the side surface and the display object are not set to be transparent, to thereby obtain an effect of preventing deterioration in visibility. As a technique of hiding a display object present on the side surface of a storage rack or on the back of another display object, for example, there is a method of holding coordinate information indicating the shape and arrangement of each storage rack by the storage unit 82, and rendering those storage racks based on the coordinate information by a rendering module in an overlapping manner from the one having a larger distance. Further, there is a method of calculating a positional relationship in accordance with the above-mentioned coordinate information in advance, and selecting a storage rack to be rendered. However, any method may be adopted.

In the first embodiment described above, the article management support system including the article information display apparatus 1 and the server 77, which are coupled to each other via a network as illustrated in FIG. 1, is illustrated. However, such a configuration is only one example, and the article management support system can be implemented by various kinds of system configurations in actuality. For example, the storage unit 82 of the article information display apparatus 1 may store the DB management module 86, the article picking opening coordinate DB 100, and the article information DB 101. With this, it is possible to implement the article management support system without the server 77. Alternatively, the storage unit 83 of the server 77 may hold the observation point coordinate/line-of-sight direction setting module 2 to the rendering module 6, the server 77 may transmit the image data generated by the rendering module 6 to the article information display apparatus 1, and the display unit 7 of the article information display apparatus 1 may display the received image. With this, it is possible to achieve simplification, downsizing, and low power consumption of the hardware of the article information display apparatus 1, for example. The same holds true for the other embodiments described later, and the article information display apparatus 1 (or glass-type article information display apparatus 10) may store at least a part of information stored by the server 77, or the server 77 may execute at least a part of processing to be executed by the article information display apparatus 1 (or glass-type article information display apparatus 10).

With the first embodiment, in order to increase the efficiency of picking work of an article stored in a storage rack, it is possible to display a list of pieces of information on a plurality of types of articles stored in respective storage spaces, which are a plurality of divisions of a storage rack, when performing the location management work of placing an article having a high shipping frequency in a space close to a shipping exit and an article having a low shipping frequency in a space far from the shipping exit, to thereby obtain an effect of enabling the administrator to grasp the current situation of each storage space and give a work instruction based on the current situation.

Further, with the first embodiment, it is possible to perform rapid calculation processing by limiting the display target.

Further, with the first embodiment, it is possible to avoid a situation in which several display objects are overlapping with one another to cause the visibility to deteriorate by hiding display objects present on the side surface of a storage rack and on the back of other display objects.

Second Embodiment

Next, a description is given of a second embodiment of this invention. An object of the second embodiment is the same as that of the first embodiment. Aside from differences described below, each component of a system according to the second embodiment has the same function as that denoted by the same reference symbol of the first embodiment illustrated in FIG. 1 to FIG. 7, and thus a description thereof is omitted here.

Figure 8:
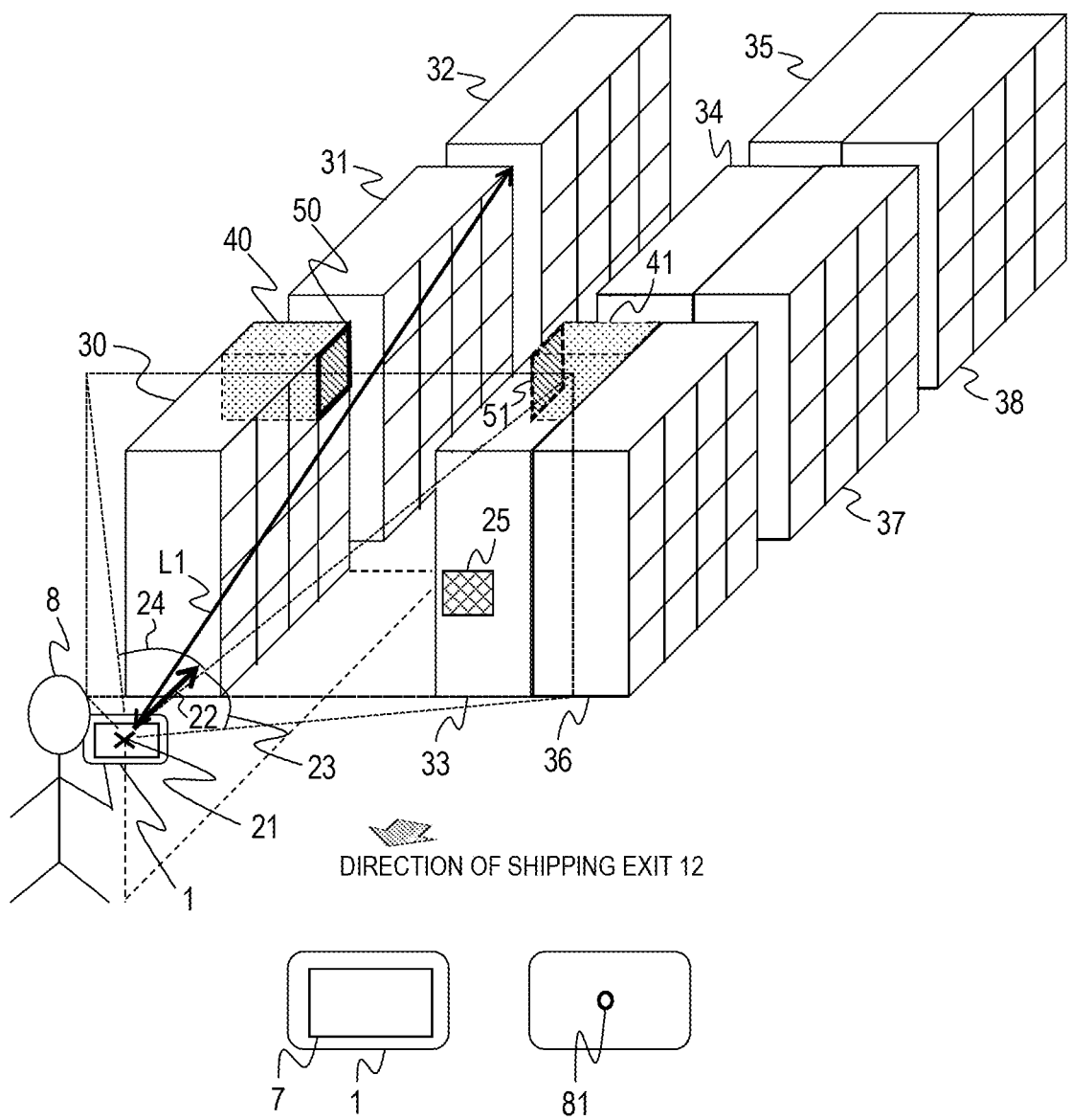
FIG. 8 is a conceptual diagram of a second embodiment of this invention.

FIG. 8 is a conceptual diagram of the second embodiment of this invention.

As compared with the conceptual diagram of the first embodiment illustrated in FIG. 3, the second embodiment is different from the first embodiment in that the article information display apparatus 1 is placed at the position of the observation point 21 and a marker 25 is attached to a side surface of the storage rack 33. In FIG. 8, the marker 25 is attached to the side surface of the storage rack 33, but the attachment position may be a surface on the article picking opening side of the storage rack, another storage rack, or a pillar near the storage rack, for example. Further, only one marker 25 is displayed in FIG. 8, but a plurality of markers 25 may be displayed inside the warehouse.

Figure 9:
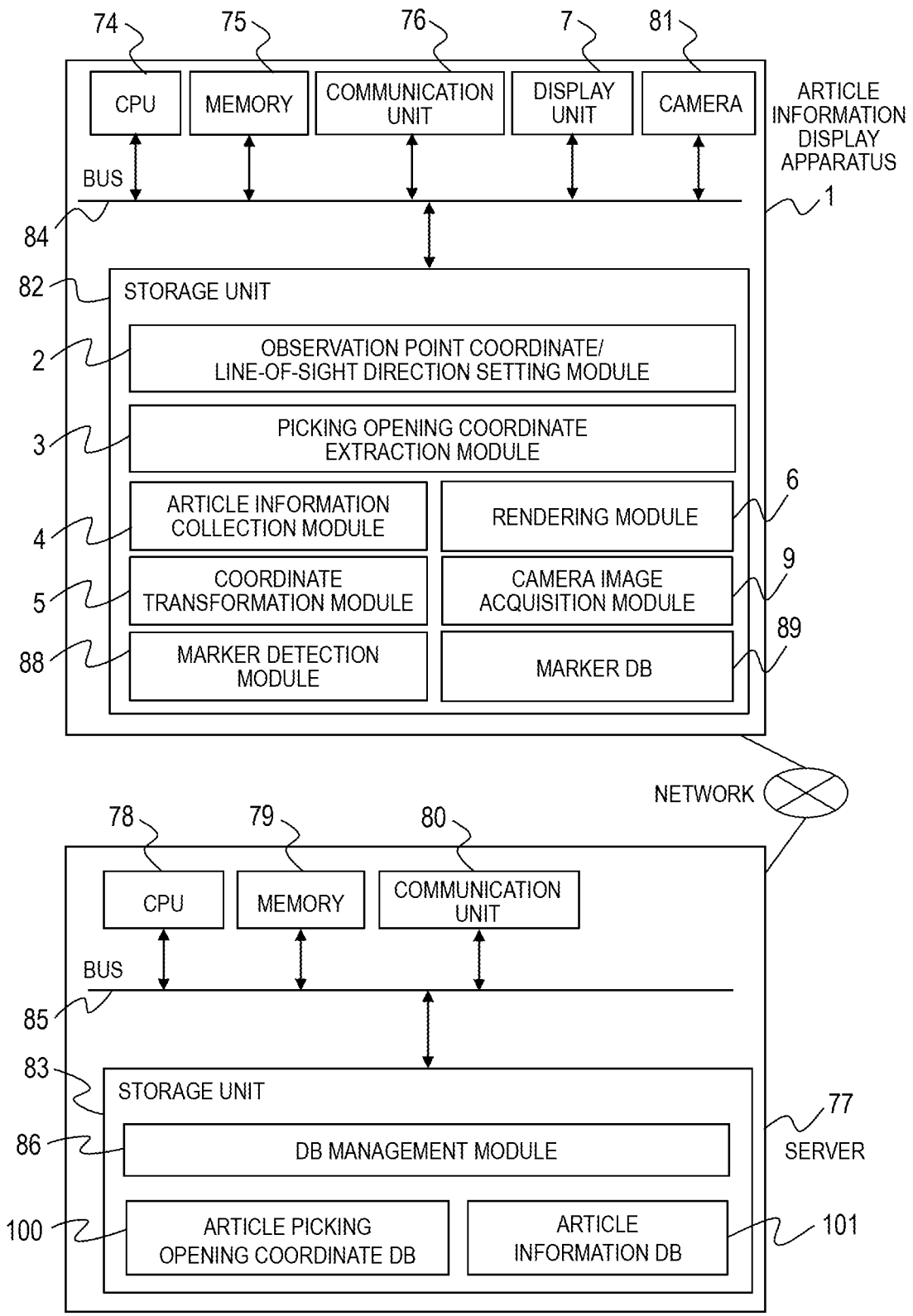
FIG. 9 is a block diagram for illustrating an example of a functional configuration of the article information display apparatus according to the second embodiment of this invention.

FIG. 9 is a block diagram for illustrating an example of a functional configuration of the article information display apparatus 1 according to the second embodiment of this invention.

In addition to a functional configuration similar to that of the article information display apparatus 1 according to the first embodiment illustrated in FIG. 1, the article information display apparatus 1 according to the first embodiment further includes a camera 81, a camera image acquisition module 9, a marker detection module 88, and a marker DB 89. Processing to be executed by the camera image acquisition module 9 and the marker detection module 88 is executed by the CPU 74 in accordance with a program code stored in the storage unit 82 in actuality.

Similarly to the first embodiment, the article information display apparatus 1 according to the second embodiment executes the sequences of Steps S101 to S106 illustrated in FIG. 2. In the second embodiment, in the observation point coordinate/line-of-sight direction setting sequence of Step S101, when the camera 81 installed on the back of the article information display apparatus 1 photographs the marker 25, the camera image acquisition module 9 acquires an image including the marker 25, and the marker detection module 88 detects the marker 25 from the image, compares the marker 25 with that of the marker DB 89, and acquires marker information. Further, the marker detection module 88 calculates coordinates of the observation point 21 and the line-of-sight direction 22 based on the vertical and horizontal size and distortion of the marker 25 in the camera image. The observation point coordinate/line-of-sight direction setting module 2 sets the coordinates of the observation point 21 and the line-of-sight direction 22 calculated by the marker detection module 88.

FIG. 26 is an explanatory table for showing an example of details of the marker DB 89 held by the article information display apparatus 1 according to the second embodiment of this invention.

The marker DB 89 includes a marker ID 2601, a coordinate X 2602, a coordinate Y 2603, a coordinate Z 2604, a direction 2605, and a characteristic code 2606. The marker ID 2601 is information for identifying each marker 25 when a plurality of markers 25 are displayed in the warehouse. The coordinate X 2602, the coordinate Y 2603, and the coordinate Z 2604 are three-dimensional coordinate values at a position of display of each marker 25 in the warehouse. The direction 2605 indicates a direction of display of each marker 25. The characteristic code 2606 is a value obtained by transforming an image of the marker 25 when the marker 25 is read by the camera, and corresponds to the marker ID 2601 on a one-to-one basis. A QR code and other marks may be adopted as the marker 25 to write a characteristic code, or the characteristic code may be calculated from a geometric pattern included in the marker 25. At this time, it is assumed that the marker size is known, but the size may be changed for each marker, and each size may be described in the marker DB 89.

The storage unit 82 of the article information display apparatus 1 stores the marker DB 89 in the above-mentioned example. However, the marker DB 89 may be stored in the storage unit 83 of the server 77, and at least a part thereof may be copied to the storage unit 82 as required.

Figure 10:
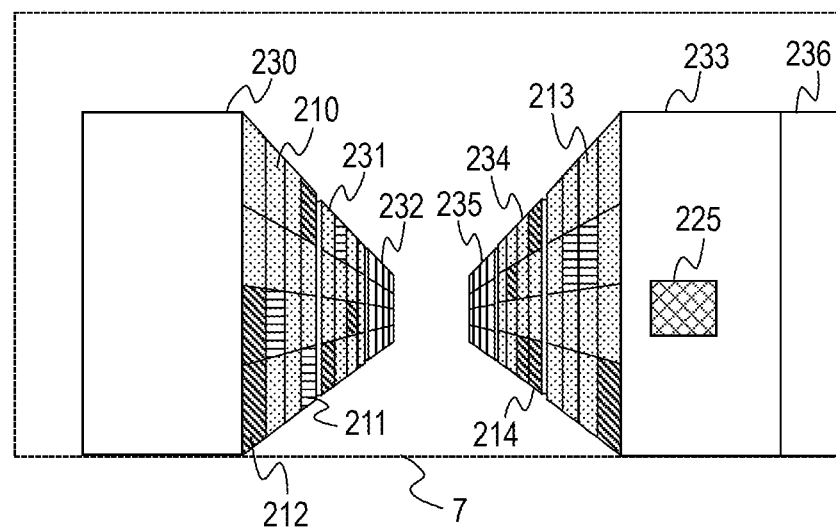
FIG. 10 is an explanatory diagram for illustrating an example of a screen to be displayed by the display unit of the article information display apparatus according to the second embodiment of this invention.

FIG. 10 is an explanatory diagram for illustrating an example of a screen to be displayed by the display unit 7 of the article information display apparatus 1 according to the second embodiment of this invention.

A camera image acquired by the camera image acquisition module 9 may be used as it is as the image of the storage rack, or may be rendered by computer graphics similarly to the first embodiment. In the second embodiment, the coordinates of the observation point 21 and the line-of-sight direction 22 are not required to be input on the screen, and can be set by photographing of the marker 25 by the camera 81 alone.

With the second embodiment, in order to increase the efficiency of picking work of an article stored in a storage rack, it is possible to display pieces of information on a plurality of types of articles stored in respective storage spaces, which are a plurality of divisions of a storage rack, by superimposing the pieces of information onto an image of each storage space photographed in a workplace, when performing the location management work of placing an article having a high shipping frequency in a space close to a shipping exit and an article having a low shipping frequency in a space far from the shipping exit, to thereby obtain an effect of enabling the administrator to grasp the current situation of each storage space and give a work instruction based on the current situation.

Further, with the second embodiment, it is possible to perform rapid calculation processing by limiting the display target.

Further, with the second embodiment, it is possible to avoid a situation in which several display objects are overlapping with one another to cause the visibility to deteriorate by hiding display objects present on the side surface of a storage rack and on the back of other display objects.

Further, with the second embodiment, compared with the first embodiment, it is possible to obtain an effect of causing input of the observation point coordinates and line-of-sight direction to be intuitive and improving the operability.

Third Embodiment

Next, a description is given of a third embodiment of this invention. An object of the third embodiment is the same as that of the first and second embodiments. Aside from differences described below, each component of a system according to the third embodiment has the same function as that denoted by the same reference symbol of the first and second embodiments illustrated in FIG. 1 to FIG. 10 and FIG. 26, and thus a description thereof is omitted here.

Figure 11:
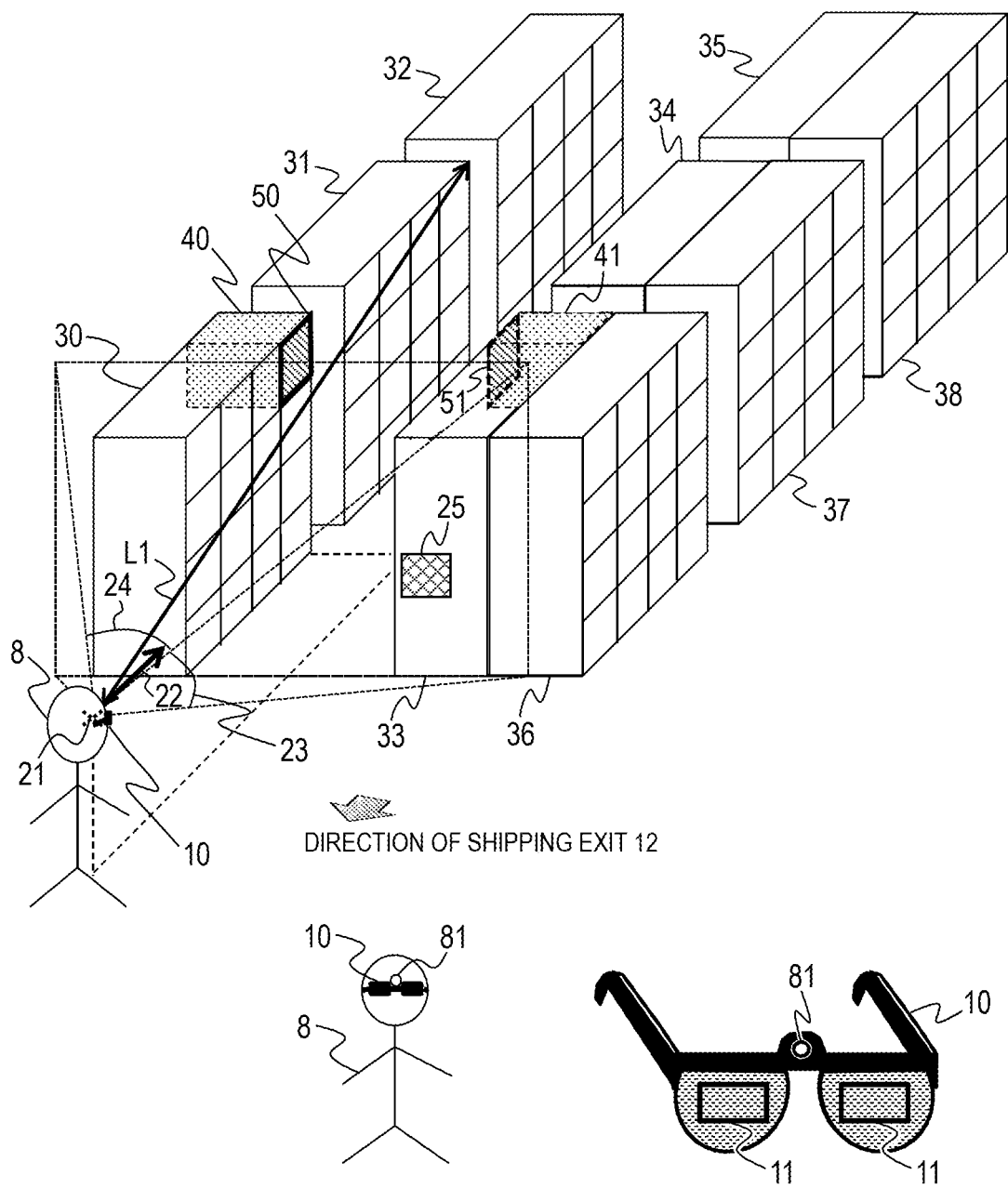
FIG. 11 is a conceptual diagram of a third embodiment of this invention.

FIG. 11 is a conceptual diagram of the third embodiment of this invention.

The third embodiment is different from a conceptual diagram of the second embodiment illustrated in FIG. 8 in that the worker 8 wearing a glass-type article information display apparatus 10 including the camera 81 and the translucent display unit 11 is placed at the position of the observation point 21.

Figure 12:
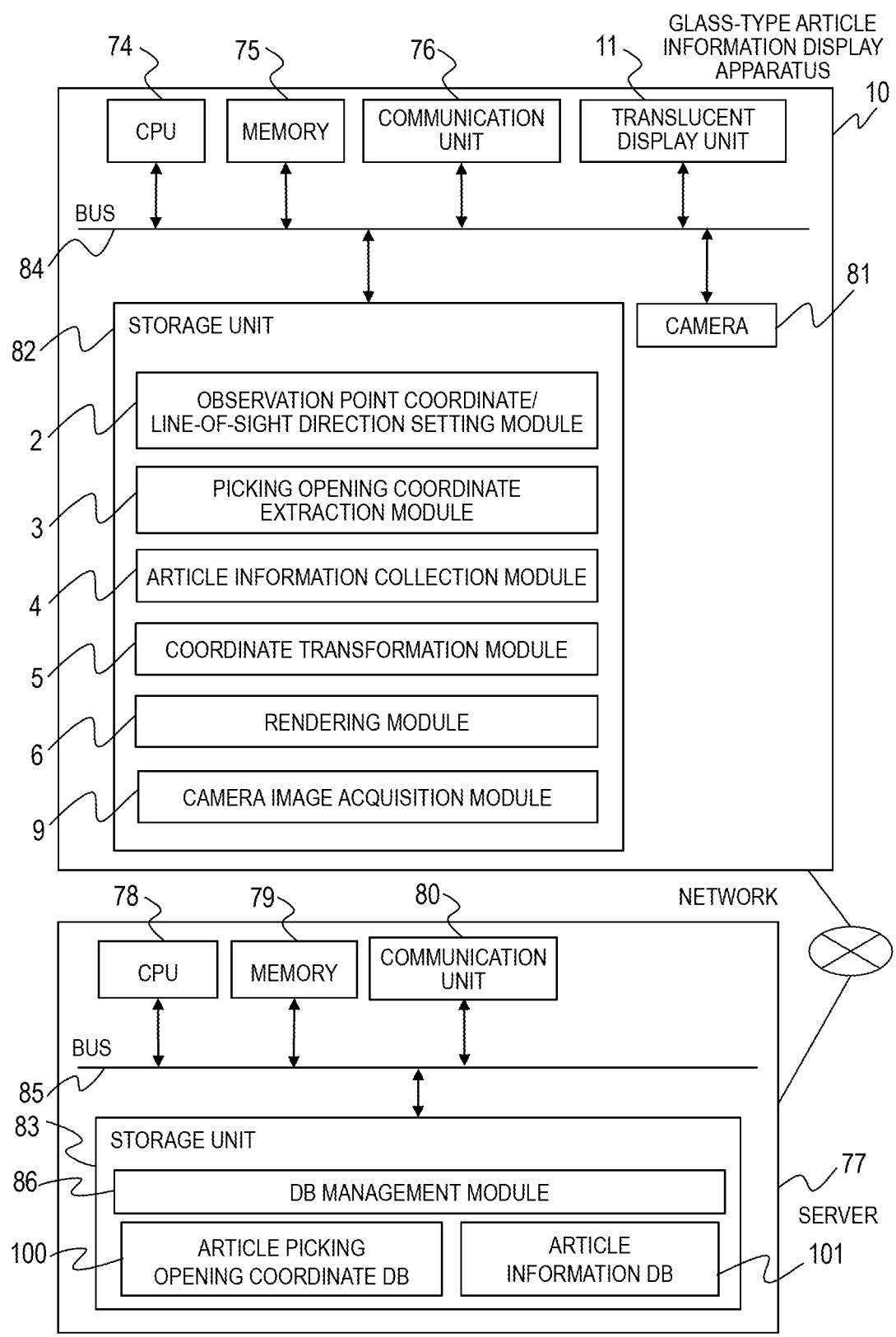
FIG. 12 is a block diagram for illustrating an example of a functional configuration of a glass-type article information display apparatus according to the third embodiment of this invention.

FIG. 12 is a block diagram for illustrating an example of a functional configuration of the glass-type article information display apparatus 10 according to the third embodiment of this invention.

The glass-type article information display apparatus 10 according to the third embodiment is different from the functional configuration of the article information display apparatus 1 according to the second embodiment illustrated in FIG. 9 in that the glass-type article information display apparatus 10 according to the third embodiment includes the translucent display unit 11. The glass-type article information display apparatus 10 is a glass-type apparatus mounted on the head of the worker 8, and when the glass-type article information display apparatus 10 is mounted, the translucent display unit 11 overlaps with at least a part of the field of view of the worker 8. Further, the camera 81 is installed in the glass-type article information display apparatus 10 so that the camera 81 photographs the front view of the worker 8 when the glass-type article information display apparatus 10 is mounted on the worker 8.

Similarly to the first embodiment and the second embodiment, the glass-type article information display apparatus 10 according to the third embodiment executes the sequences of Steps S101 to S106 illustrated in FIG. 2. The third embodiment has a feature in that, in the observation point coordinate/line-of-sight direction setting sequence of Step S101, when the camera 81 installed in the glass-type article information display apparatus 10 photographs the marker 25, the glass-type article information display apparatus 10 calculates the coordinates of the observation point 21 and the line-of-sight direction 22 from the size, position on the photographed image, and vertical and horizontal distortion of the marker.

Figure 13:
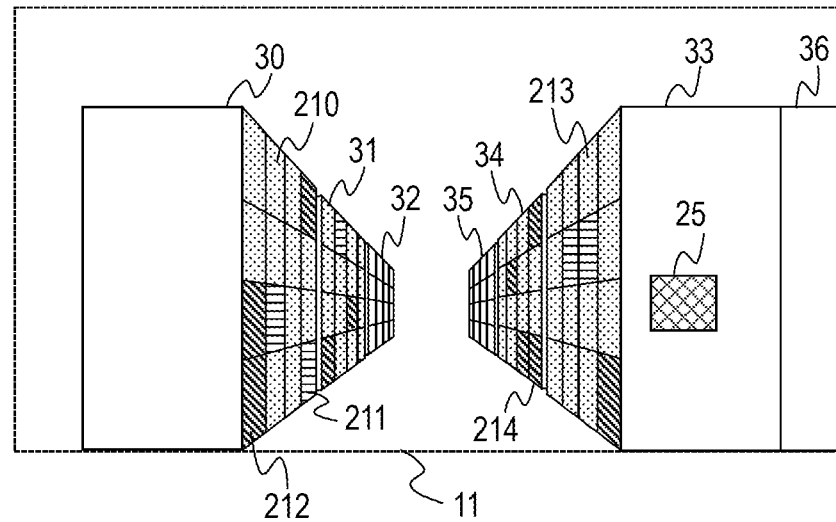
FIG. 13 is an explanatory diagram for illustrating an example of a screen to be displayed by a translucent display unit of the glass-type article information display apparatus according to the third embodiment of this invention.

FIG. 13 is an explanatory diagram for illustrating an example of a screen to be displayed by the translucent display unit 11 of the glass-type article information display apparatus 10 according to the third embodiment of this invention.

Compared with the display screen in the second embodiment, the storage racks 30, 31, 32, 33, 34, 35, and 36 and the marker 25 are transmitted through the glass and look real. The translucent display unit 11 displays a total of 64 article information display objects including ones whose reference numerals are omitted such as the article information display objects 210 to 214, by superimposing those objects onto the article picking opening of the real storage rack that looks transparent.

With the third embodiment, in order to increase the efficiency of picking work of an article stored in a storage rack, it is possible to display pieces of information on a plurality of types of articles stored in respective storage spaces, which are a plurality of divisions of a storage rack, by superimposing the pieces of information onto each storage space of the real storage rack, when performing the location management work of placing an article having a high shipping frequency in a space close to a shipping exit and an article having a low shipping frequency in a space far from the shipping exit, to thereby obtain an effect of enabling the administrator to grasp the current situation of each storage space and give a work instruction based on the current situation.

Further, with the third embodiment, it is possible to perform rapid calculation processing by limiting the display target.

Further, with the third embodiment, it is possible to avoid a situation in which several display objects are overlapping with one another to cause the visibility to deteriorate by hiding display objects present on the side surface of a storage rack and on the back of other display objects.

Further, with the third embodiment, compared with the first embodiment, it is possible to obtain an effect of causing input of the observation point coordinates and line-of-sight direction to be intuitive and improving the operability.

Further, with the third embodiment, the glass-type article information display apparatus 10 can be used to perform work by using both hands while looking at the display at the time of work.

Fourth Embodiment

Next, a description is given of a fourth embodiment of this invention. An object of the fourth embodiment is to create an instruction document for moving an article having a high shipping frequency in a storage space far from the shipping exit 12 to a storage space close to the shipping exit 12, and correcting the article information DB 101 after the completion of movement. Aside from differences described below, each component of a system according to the fourth embodiment has the same function as that denoted by the same reference symbol of the first to third embodiments illustrated in FIG. 1 to FIG. 13 and FIG. 26, and thus a description thereof is omitted here.

A conceptual diagram of the fourth embodiment is the same as that of the second embodiment illustrated in FIG. 8.

Figure 14:
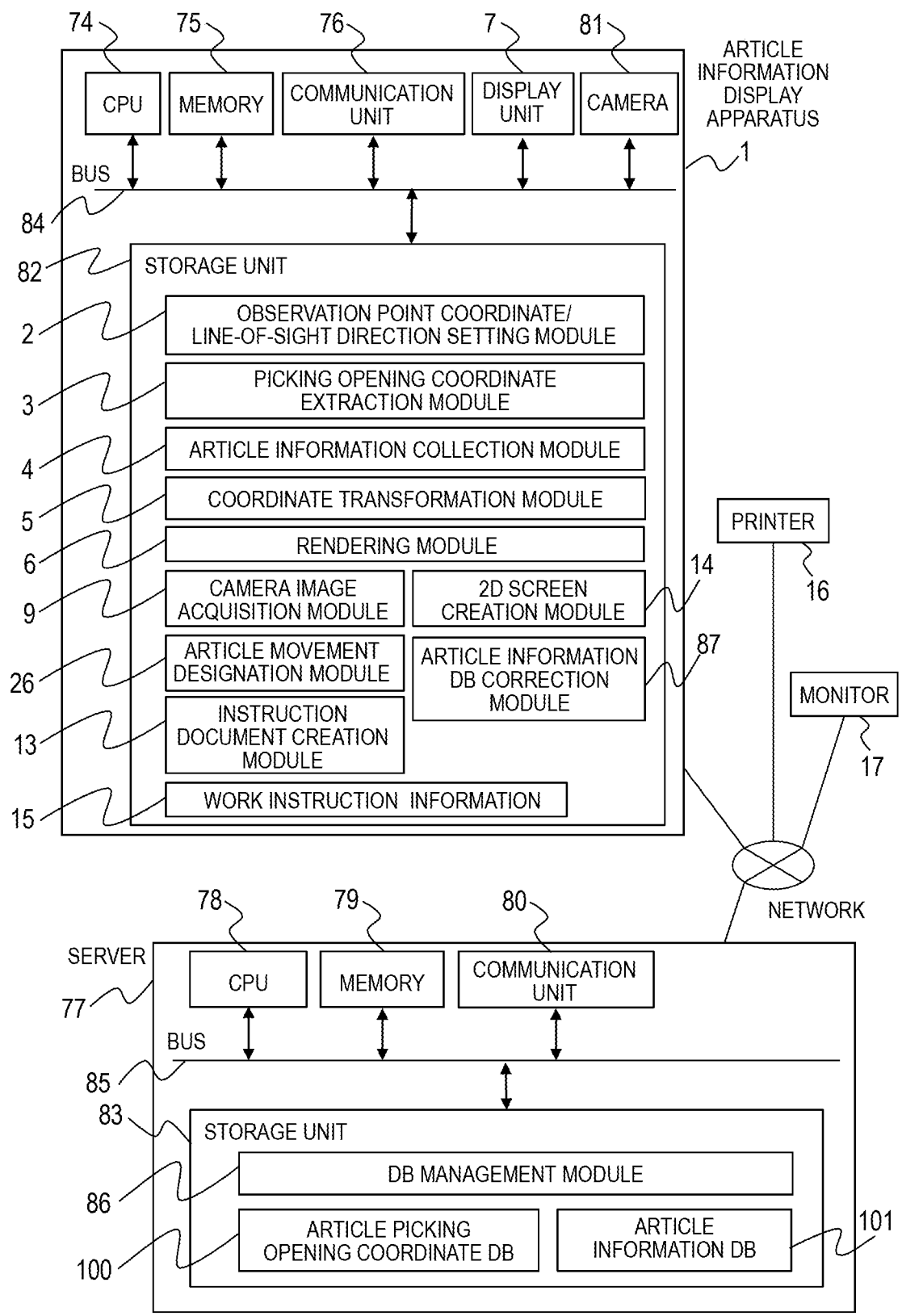
FIG. 14 is a block diagram for illustrating an example of a functional configuration of the article information display apparatus according to a fourth embodiment of this invention.

FIG. 14 is a block diagram for illustrating an example of a functional configuration of the article information display apparatus 1 according to the fourth embodiment of this invention.

Compared with the functional configuration of the article information display apparatus 1 according to the second embodiment illustrated in FIG. 9, the article information display apparatus 1 according to the fourth embodiment further includes an article movement designation module 26, an instruction document creation module 13, a 2D screen creation module 14, a work instruction information 15, and an article information DB correction module 87. Processing to be executed by the article movement designation module 26, the instruction document creation module 13, the 2D screen creation module 14, and the article information DB correction module 87 is executed by the CPU 74 in accordance with a program code stored in the storage unit 82 in actuality. Further, a printer 16 and a monitor 17 are coupled to the article information display apparatus 1 according to the fourth embodiment via a network.

Figure 15:
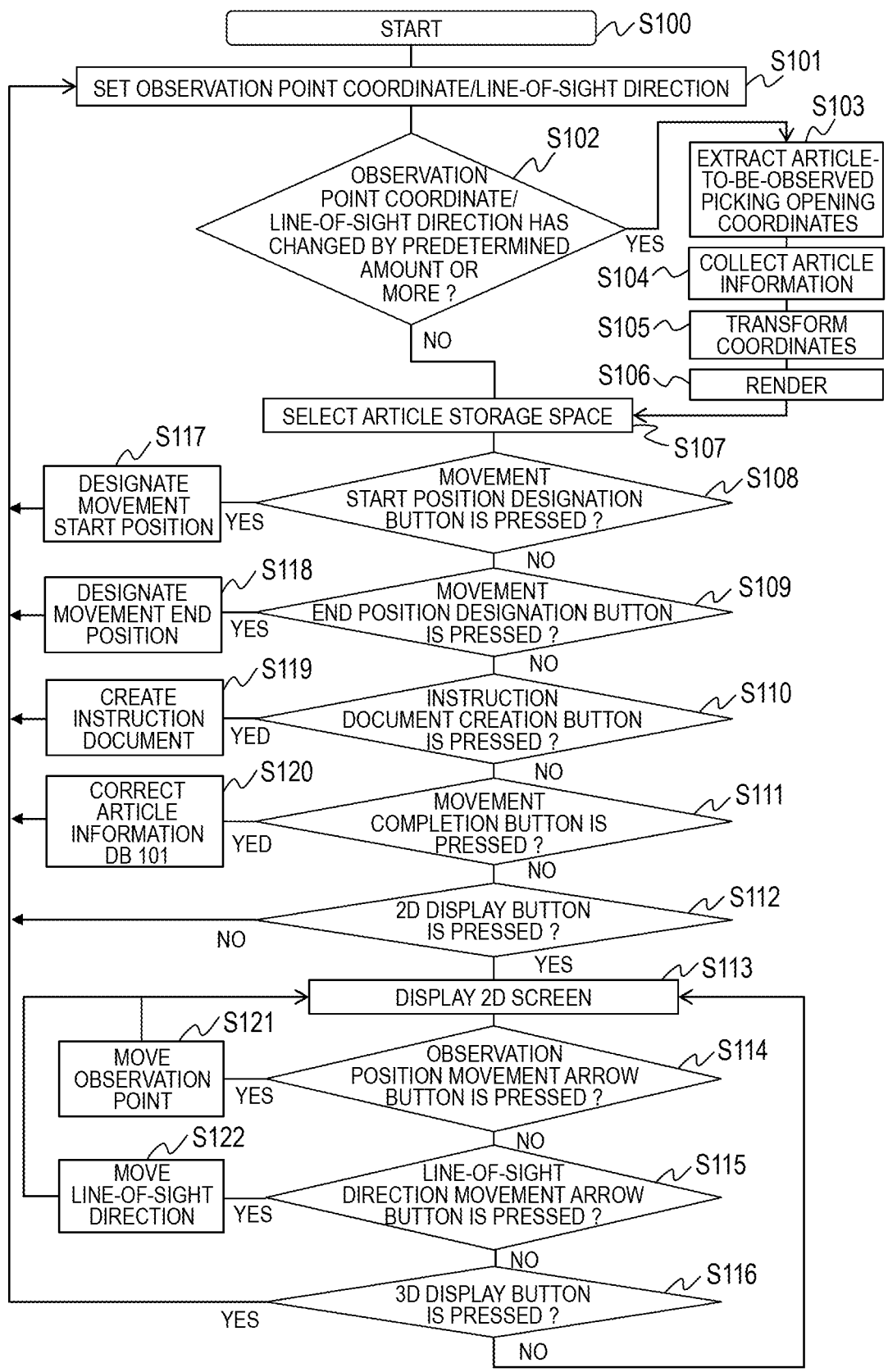
FIG. 15 is a flow chart for illustrating processing to be executed by the article information display apparatus according to the fourth embodiment of this invention.

FIG. 15 is a flow chart for illustrating processing to be executed by the article information display apparatus 1 according to the fourth embodiment of this invention.

The processing from the start of Step S100 to the rendering sequence of Step S106 is the same as that of the second embodiment.

Figure 16:
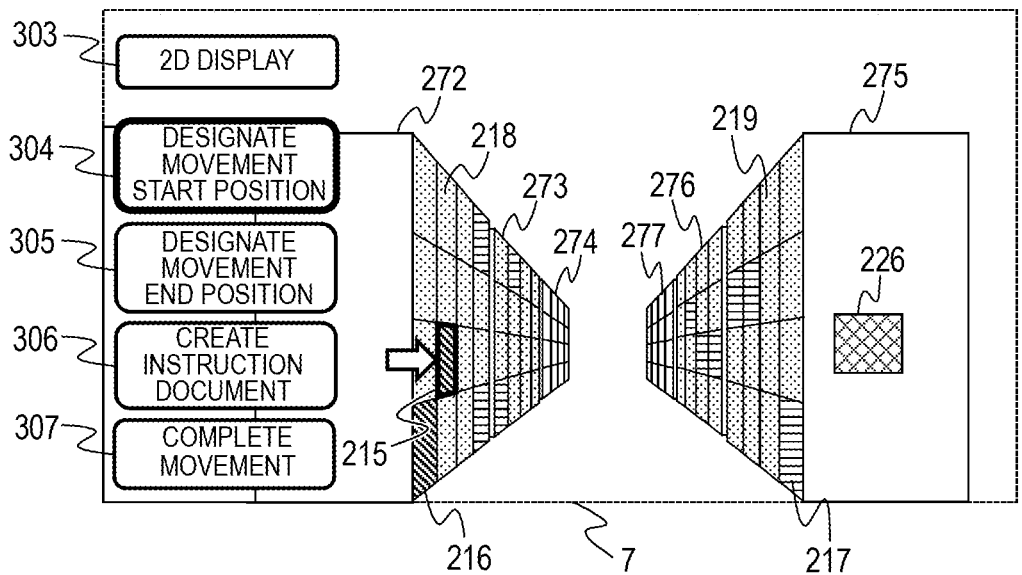
FIG. 16 is an explanatory diagram for illustrating an example of a screen for designating a storage space at a movement start position to be displayed by the display unit of the article information display apparatus according to the fourth embodiment of this invention.

FIG. 16 is an explanatory diagram for illustrating an example of a screen for designating a storage space at a movement start position to be displayed by the display unit 7 of the article information display apparatus 1 according to the fourth embodiment of this invention.

The screen illustrated in FIG. 16 is rendered in Step S106. On the screen of FIG. 16, a total of 64 article information display objects including ones whose reference numerals are omitted such as article information display objects 215, 216, 217, 218, and 219 are displayed. Those are similar to the article information display objects 210 to 214 in the first embodiment, for example. Further, on the screen of FIG. 16, storage racks 272, 273, 274, 275, 276, and 277 and a marker 226 are displayed. The screen illustrated in FIG. 16 is different from FIG. 10, which is the rendered screen in the second embodiment, in that the displayed location is different (specifically, a storage rack and the like seen from the observation point 21 different from that of FIG. 10 are displayed), and further in that a 2D display button 303, a movement start position designation button 304, a movement end position designation button 305, an instruction document creation button 306, and a movement completion button 307 are installed on the screen.

The screen of FIG. 16 is used for designating a storage space at the movement start position. In a storage space selection sequence of Step S107, the worker 8 selects an article information display object displayed on a storage space at the movement start position by using a touch sensor on the screen, a mouse, a stylus pen, or movement of a cursor on a keyboard, or other means. In FIG. 16, an article information display object 215 is selected, but the worker 8 may select a plurality of storage spaces at the same time.

Next, when the article movement designation module 26 detects in Step S108 that the worker 8 has pressed the movement start position designation button 304, the article movement designation module 26 executes a movement start position setting sequence of Step S117 of recording the storage rack at the movement start position into the work instruction information 15.

Next, the worker 8 selects a storage space at the movement destination in Step S107. In general, there are few cases in which there are a storage rack at the movement start position and a storage space at the movement end position on the same screen, and thus it is required to find another space that is not displayed on the screen on which the movement start position is designated. In view of this, when it is detected in Step S112 that the worker 8 has pressed the 2D display button 303 (that is, the fact that an instruction to display a plan view is input), the 2D screen creation module 14 creates a plan view of a space including an article storage space, and the screen displayed by the display unit 7 transitions to the plan view.

Figure 17:
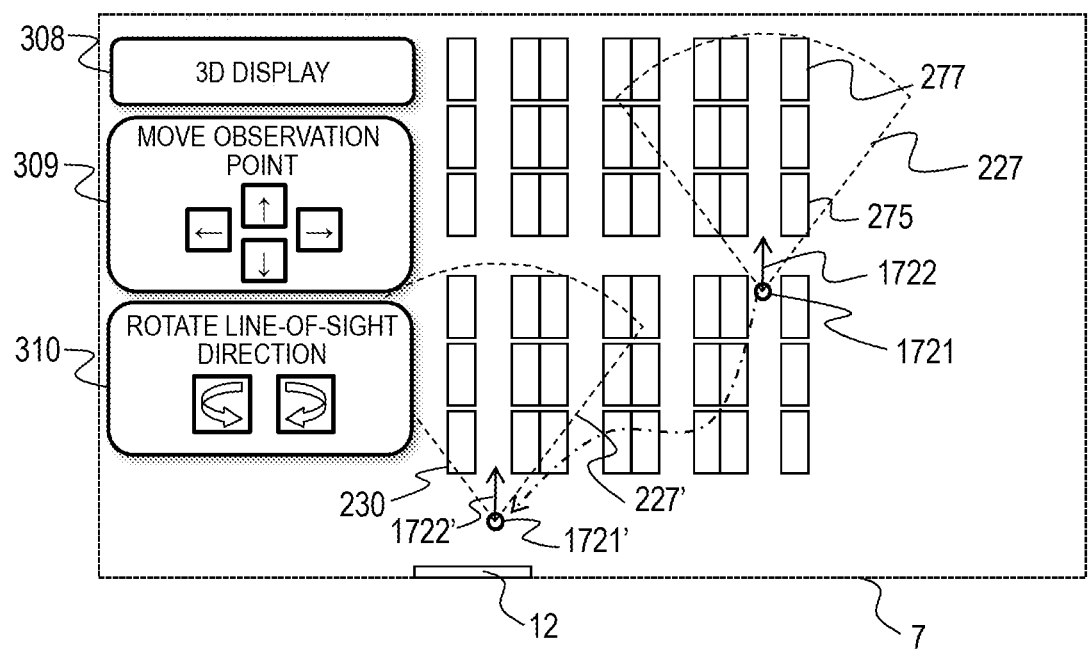
FIG. 17 is an explanatory diagram for illustrating an example of a plan view of the entire warehouse created by a 2D screen creation module of the article information display apparatus according to the fourth embodiment of this invention.

FIG. 17 is an explanatory diagram for illustrating an example of a plan view of the entire warehouse created by the 2D screen creation module 14 of the article information display apparatus 1 according to the fourth embodiment of this invention.

In this plan view, display objects 230, 275, 277, and the like of the storage rack and a display object of the shipping exit 12 are displayed. An observation point 1721 and a line-of-sight direction 1722 of FIG. 17 are obtained by the 2D screen creation module 14 rendering the (currently set) observation point 21 and line-of-sight direction 22 in FIG. 16 on the plan view. Further, an article selection range 227 indicates an article selection range of a distance L within a range of the horizontal angle of view 24 from the observation point 21 in FIG. 16 with respect to the line-of-sight direction. In FIG. 17, besides, a 3D display button 308, an observation point movement window 309, and a line-of-sight direction rotation window 310 are set.

When the article movement designation module 26 detects in Step S114 that an arrow button of the observation point movement window 309 is pressed (that is, the fact that an instruction to change the position of the observation point 21 is input), the article movement designation module 26 performs processing of Step S121 of moving the observation point in the arrow direction.

When the article movement designation module 26 detects in Step S115 that an arrow button of the line-of-sight direction rotation window 310 is pressed (that is, detects that an instruction to change the line-of-sight direction 22 is input), the article movement designation module 26 performs processing of rotating the line-of-sight direction in the direction of the button pressed in Step S122.

In FIG. 17, an observation point 1721', a line-of-sight direction 1722', and an article selection range 227' after movement through an operation of a button on the observation point movement window 309 are illustrated. Those are rendered by the 2D screen creation module 14 based on information input via the observation point movement window 309 and the line-of-sight direction rotation window 310.

Figure 18:
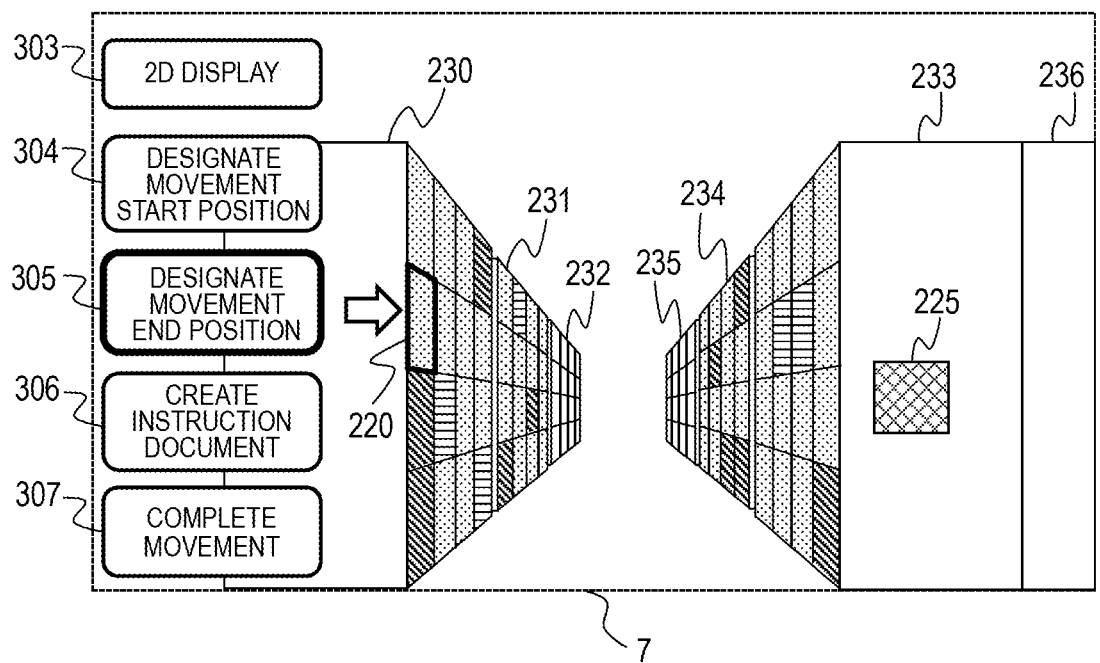
FIG. 18 is an explanatory diagram for illustrating an example of a screen for designating a storage space at a movement end position to be displayed by the display unit of the article information display apparatus according to the fourth embodiment of this invention.

After that, when it is detected in Step S116 that the worker 8 has pressed the 3D display button 308 (that is, the fact that an instruction to display a three-dimensional image is input), the display unit 7 transitions the displayed screen to a 3D display screen of FIG. 18.

FIG. 18 is an explanatory diagram for illustrating an example of a screen for designating a storage space at a movement end position to be displayed by the display unit 7 of the article information display apparatus 1 according to the fourth embodiment of this invention.

The observation point coordinate/line-of-sight direction setting module 2 sets the position of the observation point 21 and the line-of-sight direction 22, which are changed by an operation of the observation point movement window 309 and the line-of-sight direction rotation window 310, and processing by the picking opening coordinate extraction module 3 to the rendering module 6 is executed based on the observation point 21 and the line-of-sight direction 22, with the result that an image as illustrated in FIG. 18 is generated.

In the example of FIG. 17, a button is pressed to change the observation point and the line-of-sight direction, but a swipe operation on a touch panel may be used to directly move the observation point and the line-of-sight direction. Further, in the fourth embodiment, the screen is caused to transition to the plan view illustrated in FIG. 17 to virtually move the observation location. However, the worker 8 may walk to a location at which the storage space at the movement end position can be seen, and use the camera 81 to read the marker 25 so that the display unit 7 displays the screen of FIG. 18. When the marker 25 is read to display the screen, a camera image acquired by the camera image acquisition module 9 as display objects 230, 231, 232, 233, 234, 235, and 236 and a marker 225 of the storage rack to be displayed in FIG. 18 may be displayed as it is. When the marker is not read and the screen of FIG. 18 is rendered via the screen of FIG. 17, there is no corresponding camera image, and thus the display objects 230, 231, 232, 233, 234, 235, and 236 of the storage rack and the marker 225 are displayed by computer graphics.

After the transition to the screen of FIG. 18, in the storage space selection sequence of Step S107, the worker 8 selects an article information display object 220 corresponding to the storage space at the movement end point by using a touch sensor on the screen, a mouse, a stylus pen, or movement of a cursor on a keyboard, for example. In the example of FIG. 18, the article information display object 220 is selected, but the worker 8 may select a plurality of storage spaces at the same time.

Next, when the article movement designation module 26 detects in Step S108 that the worker 8 has pressed the movement end position designation button 305, the article movement designation module 26 executes a movement end position setting sequence of Step S118 of recording the storage rack at the movement end position into the work instruction information 15.

After that, when it is detected in Step S110 that the worker 8 has pressed the instruction document creation button 306, in an instruction document creation sequence of Step S119, the instruction document creation module 13 creates a work instruction document in accordance with the work instruction information 15, and outputs the work instruction document by printing the work instruction document by the printer 16, displaying the work instruction document by the monitor 17, or other such method.

After another worker who has received an instruction from the worker 8 or the worker 8 moves an article from the storage space at the movement start position to the storage space at the movement end position in accordance with instruction details, the worker 8 presses the movement completion button 307. When pressing of the movement completion button 307 is detected in the sequence of Step S111 of FIG. 15, the article information DB correction module 87 corrects information of the article information DB 101 in a sequence of Step S120 so as to reflect the completed movement of the article.

With the fourth embodiment, the effect described in the second embodiment can be obtained. In addition, it is possible to create a work instruction document or work instruction information on the monitor, which is used for selecting an article having a high shipping frequency stored in a space far from the shipping exit and exchanging the storage space with a storage space close to the shipping exit and storing an article having a low shipping frequency, at the workplace while checking the current situation of the workspace. Further, it is possible to correct the database after completion of actual work at the workplace immediately after the work.

Fifth Embodiment

Next, a description is given of a fifth embodiment of this invention. An object of the fifth embodiment is to calculate assignment of storage spaces for moving an article having a high shipping frequency in a storage space far from the shipping exit 12 to a storage space close to the shipping exit 12, create an instruction document, and correct the article information DB 101 after completion of movement. Aside from differences described below, each component of a system according to the fifth embodiment has the same function as that denoted by the same reference symbol of the first to fourth embodiments illustrated in FIG. 1 to FIG. 18 and FIG. 26, and thus a description thereof is omitted here.

A conceptual diagram of the fifth embodiment is roughly the same as that of the second embodiment illustrated in FIG. 8.

Figure 21:
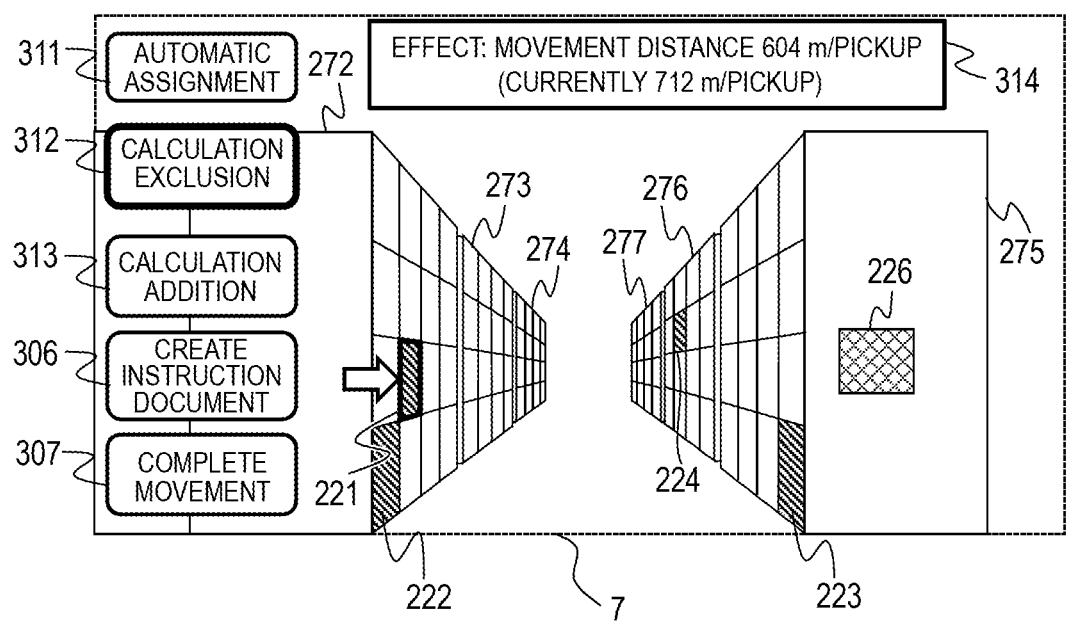
FIG. 21 is an explanatory diagram for illustrating an example of a screen to be displayed by the display unit of the article information display apparatus according to the fifth embodiment of this invention.

FIG. 21 is an explanatory diagram for illustrating an example of a screen to be displayed by the display unit 7 of the article information display apparatus 1 according to the fifth embodiment of this invention.

The screen illustrated in FIG. 21 is roughly the same as that of the second embodiment illustrated in FIG. 10, but an automatic assignment button 311, a calculation exclusion button 312, a calculation addition button 313, and an effect display 314 are added. Further, article information display objects 221 to 224 are indicated by color or light and shade representing a location movement division A. The article information display object may be indicated by color or light and shade representing a location movement division B, but there is no such object in FIG. 21 of the fifth embodiment.

Figure 19:
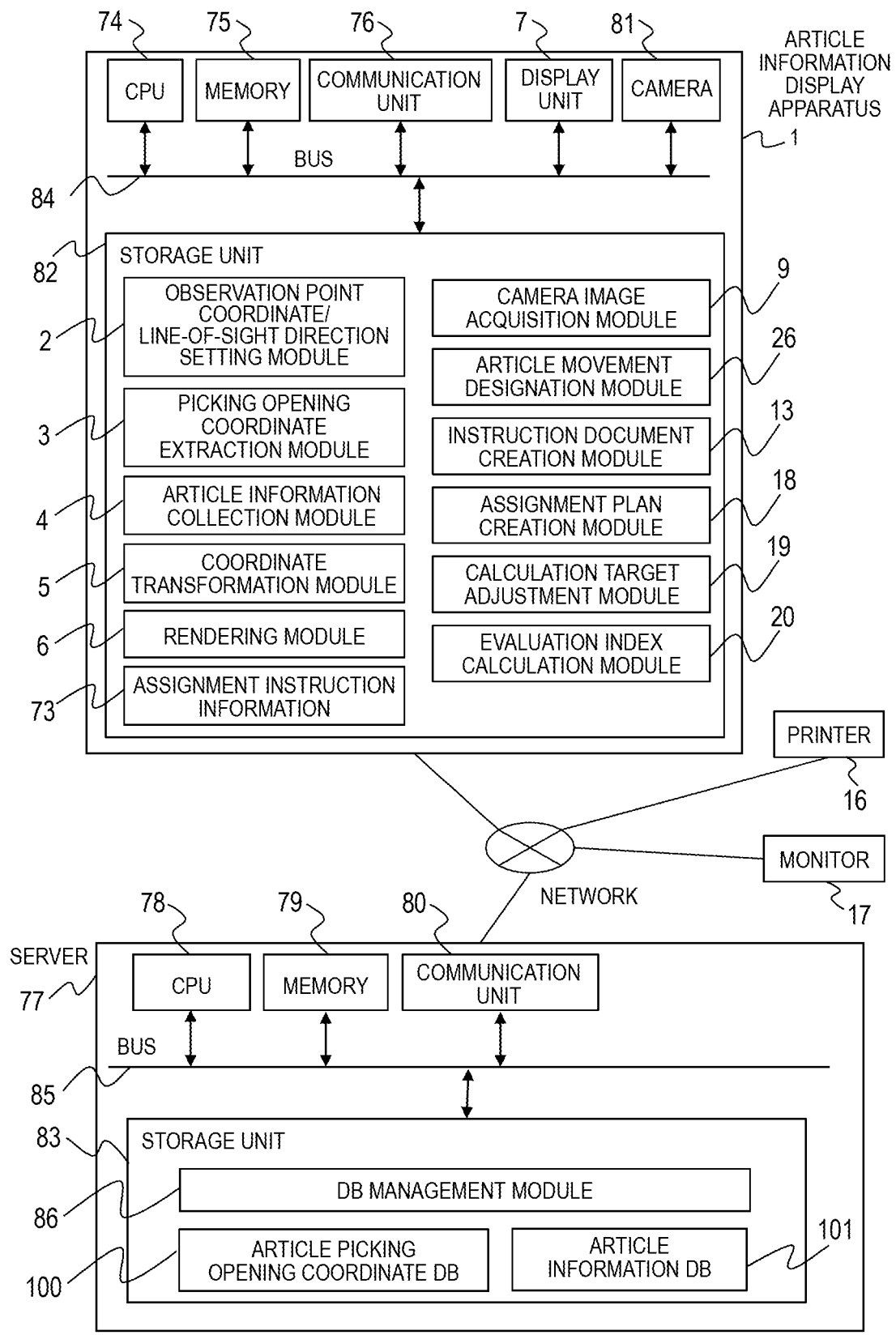
FIG. 19 is a block diagram for illustrating an example of a functional configuration of the article information display apparatus according to a fifth embodiment of this invention.

FIG. 19 is a block diagram for illustrating an example of a functional configuration of the article information display apparatus 1 according to the fifth embodiment of this invention.

Compared with the functional configuration of the fourth embodiment illustrated in FIG. 14, in the article information display apparatus 1 according to the fifth embodiment, the 2D screen creation module 14 is deleted, and an assignment plan creation module 18, a calculation target adjustment module 19, and an evaluation index calculation module 20 are added. Processing to be executed by the assignment plan creation module 18, the calculation target adjustment module 19, and the evaluation index calculation module 20 is executed by the CPU 74 in accordance with a program code stored in the storage unit 82 in actuality.

Figure 20:
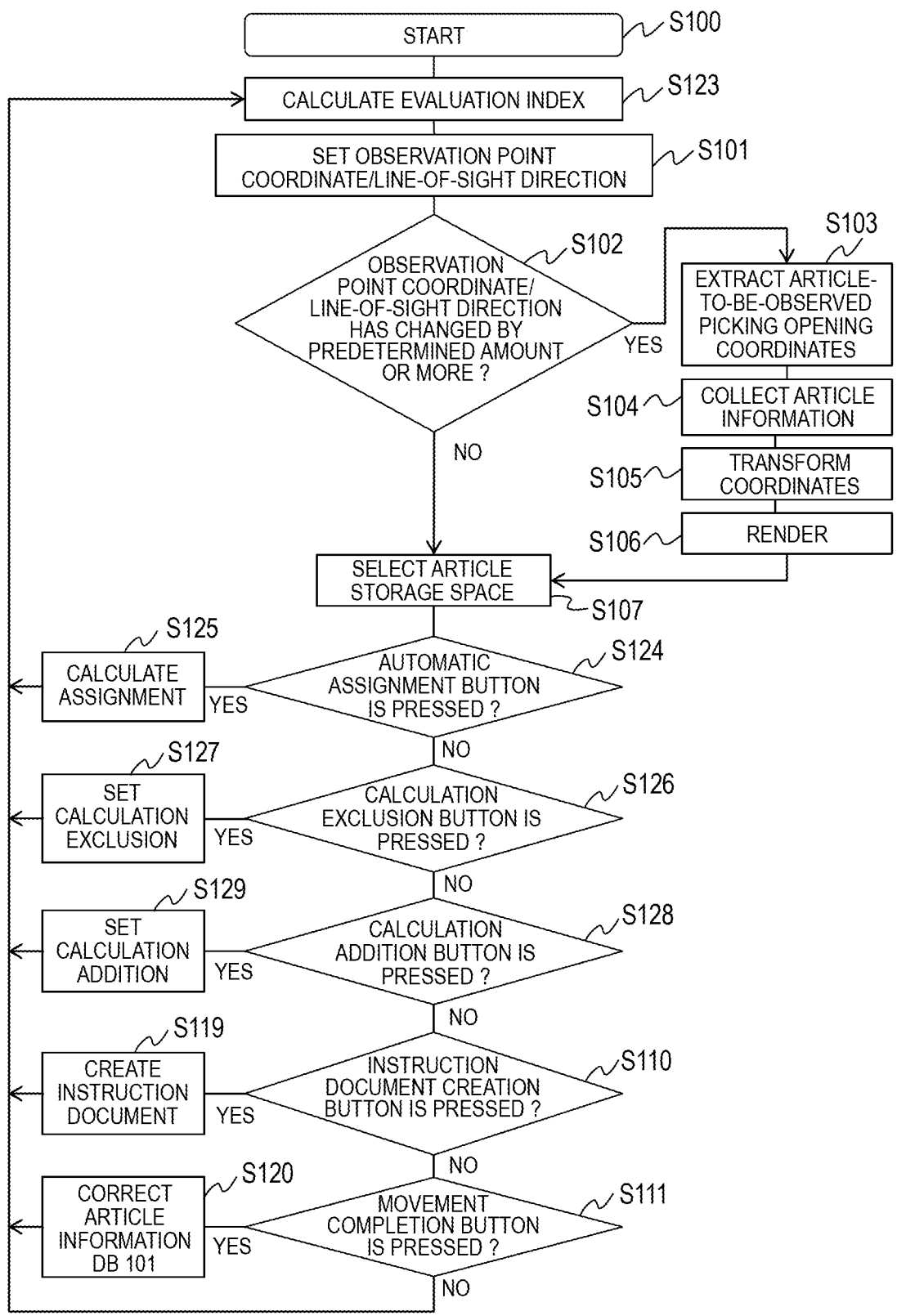
FIG. 20 is a flow chart for illustrating processing to be executed by the article information display apparatus according to the fifth embodiment of this invention.

FIG. 20 is a flow chart for illustrating processing to be executed by the article information display apparatus 1 according to the fifth embodiment of this invention.

After the start sequence of Step S100, the evaluation index calculation module 20 calculates an evaluation index before location management operation in an evaluation index calculation sequence of Step S123. The evaluation index is an index for evaluating whether arrangement (namely, storage space of each article) of articles in the warehouse is appropriate in terms of, for example, the work efficiency in the warehouse. Specifically, the evaluation index is considered to be, for example, a movement distance (meters/pickup) per one pickup operation (hereinafter referred to as "one pickup") or man-hour (persons/day) required for work in one day. The subsequent rendering sequence from Step S101 to Step S107 is the same as that of the fourth embodiment.

Next, when it is detected in the sequence of Step S124 that the worker 8 has pressed the automatic assignment button 311, the assignment plan creation module 18 calculates an assignment method that reduces the workload of picking in an assignment calculation sequence of Step S125. In the fifth embodiment, the assignment plan creation module 18 calculates an assignment method that replaces an article in a storage space of the location movement division A with an article in a storage space of the location movement division B. In the fifth embodiment, it is assumed that an article may be moved to anywhere in a storage space within the same location movement division. The assignment method may be a method of individually designating a storage space on a one-to-one basis, or other methods may be presented.

The workload of picking in the above-mentioned example is an example of the index indicating the amount of work performed by the worker 8, and another index that may change due to a change in assignment may be used. For example, the assignment plan creation module 18 may calculate an assignment method that reduces the evaluation index calculated by the evaluation index calculation module 20.

For example, the assignment plan creation module 18 may calculate the amount of work to be performed by the worker 8 based on, for example, the arrangement of storage spaces in the warehouse, a positional relationship between each storage space and the shipping exit 12, and a shipment quantity for each shipment destination of each article stored in each storage space, and when replacement of an article stored in one storage space with an article stored in another storage space reduces the amount of work, set one of those storage spaces as the location movement division A and the other of those storage spaces as the location movement division B. With this, at least two storage spaces are selected so that articles stored in the respective storage spaces are to be replaced (exchanged).

After the assignment calculation sequence of Step S125 is finished, the processing returns to the evaluation index calculation sequence of Step S123 to calculate an evaluation index after assignment by the evaluation index calculation module 20. The calculated evaluation index is displayed as the effect display 314 on the screen illustrated in FIG. 21 in the subsequent rendering sequence of Step S106. Further, the article information display object evaluated to be the location movement division A and the article information display object evaluated to be the location movement division B are each displayed by the corresponding color or light and shade. It is assumed that the article information display object that does not belong to any location movement division is displayed as a transparent object.

After the worker 8 selects an article information display object in the sequence of Step S107, when it is detected in Step S126 that the calculation exclusion button 312 is pressed, the calculation target adjustment module 19 records, into assignment instruction information 73, information indicating that a storage space corresponding to the selected article information display object is not subjected to the subsequent assignment calculation sequence of Step S125 (Step S127). In other words, the storage space selected in this manner is not selected as a replacement target by the assignment plan creation module 18. After Step S127 is finished, the processing returns to the evaluation index calculation sequence of Step S123, and the evaluation index calculation module 20 calculates an evaluation index after execution of assignment based on the assignment instruction information 73. The calculated evaluation index is displayed as the effect display 314 on the screen illustrated in FIG. 21 in the subsequent rendering sequence of Step S106. Further, the article information display object evaluated to be the location movement division A and the article information display object corresponding to a storage space evaluated to be the location movement division B are each displayed by the corresponding color or light and shade.

For example, an article storage space close to the shipping exit 12 is generally appropriate for storing an article having a high shipping frequency. However, in a case where an article temporarily placed near an article storage space hinders work of shipping from the article storage space, namely, a case in which the article storage space is not temporarily appropriate for storing an article having a high shipping frequency, the article storage space can be excluded from the calculation target to prevent assignment that does not suit the situation of the workplace.

After the worker 8 selects an article information display object in the sequence of Step S107, when it is detected in Step S128 that the calculation addition button 313 is pressed, the calculation target adjustment module 19 records, into the assignment instruction information 73, a storage space corresponding to the selected article information display object as a target to which a location movement division is forcibly assigned in the subsequent assignment calculation sequence S125 (Step S129). In other words, the storage space selected in this manner is always selected as a replacement target by the assignment plan creation module 18. After Step S129 is finished, the processing returns to the evaluation index calculation sequence of Step S123, and the evaluation index calculation module 20 calculates an evaluation index after execution of assignment based on the assignment instruction information 73. The calculated evaluation index is displayed as the effect display 314 on the screen illustrated in FIG. 21 in the subsequent rendering sequence of Step S106. Further, the article information display object evaluated to be the location movement division A and the article information display object corresponding to a storage space evaluated to be the location movement division B are each displayed by the corresponding color or light and shade.

The operations of Step S110, Step S111, Step S119, and Step S120 are the same as those of the fourth embodiment.

With the fifth embodiment, in addition to the effect described in the second embodiment, it is possible to automatically perform assignment calculation for exchanging the space of an article having a high shipping frequency, which is far from a shipping exit, with the space of an article having a low shipping frequency, which is close to the shipping exit, and easily perform work of adding an article storage space to be subjected to assignment calculation or excluding an article storage space from the candidate while checking display of the effect. Further, it is possible to check the evaluation index on the screen as a guide to trial and error of those works.

Further, with the fifth embodiment, it is possible to correct the database after completion of actual work at the workplace immediately after the work.

Sixth Embodiment

Next, a description is given of a sixth embodiment of this invention. An object of the sixth embodiment is to implement a picking support apparatus configured to, in picking work, display the number of articles to be picked up by superimposing the number onto a storage space for picking, and notify a relevant system of completion of picking after the picking operation.

Aside from differences described below, each component of a system according to the sixth embodiment has the same function as that denoted by the same reference symbol of the first to fifth embodiments illustrated in FIG. 1 to FIG. 21 and FIG. 26, and thus a description thereof is omitted here.

Figure 25:
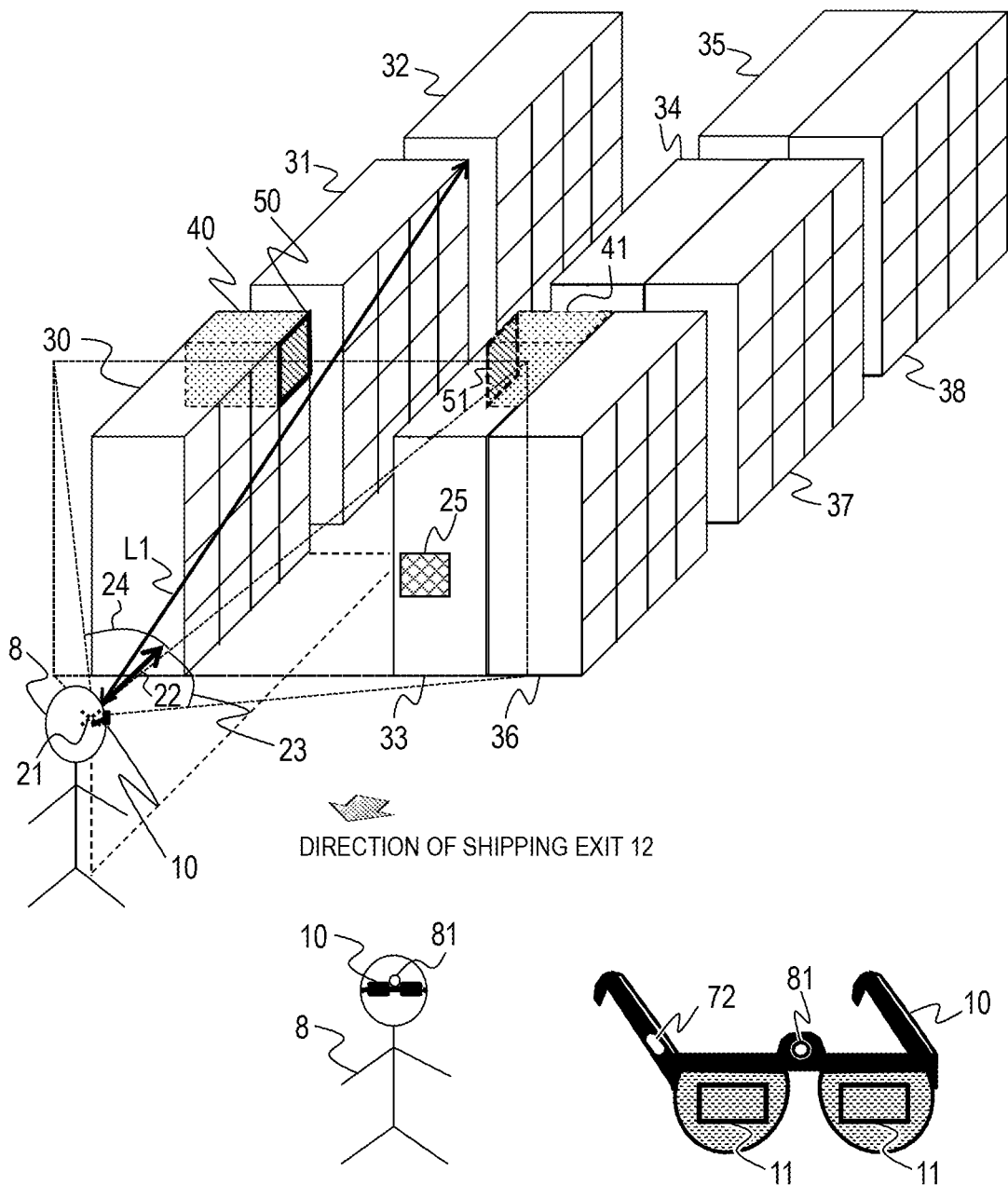
FIG. 25 is a conceptual diagram of the sixth embodiment of this invention.

FIG. 25 is a conceptual diagram of the sixth embodiment of this invention.

The concept of the sixth embodiment is roughly the same as that of the third embodiment illustrated in FIG. 11, but is different in that a picking completion button 72 is assigned to the glass-type article information display apparatus 10. The picking completion button 72 is a part to which information indicating completion of picking is to be input.

Figure 24:
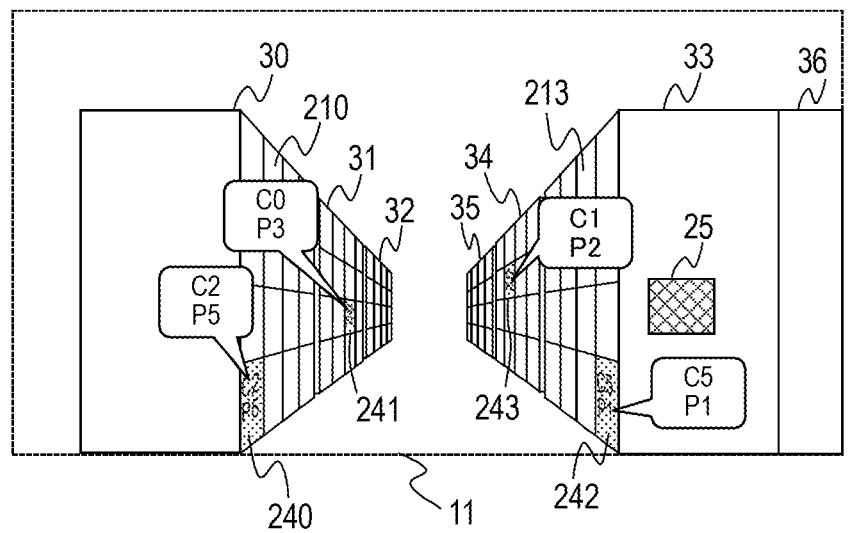
FIG. 24 is an explanatory diagram for illustrating an example of a screen to be displayed by the translucent display unit of the glass-type article information display apparatus according to the sixth embodiment of this invention.

FIG. 24 is an explanatory diagram for illustrating an example of a screen to be displayed by the translucent display unit 11 of the glass-type article information display apparatus 10 according to the sixth embodiment of this invention.

The screen illustrated in FIG. 24 is roughly the same as that of the third embodiment illustrated in FIG. 13, but the article information display objects 240 to 243 are superimposed onto the article picking openings of storage spaces for picking and displayed. In the sixth embodiment, the article information display objects 240 to 243 include numbers indicating the number of cases (the number of cases bundling a plurality of articles, which is displayed by C+ (number)) to be picked up and indicating the number of pieces (the number of individual articles, which is displayed by P+ (number)) to be picked up, and those objects are displayed on the plane colored with light and shade or color in order to increase those visibilities.

In FIG. 24, for the sake of convenience, the numbers of cases and pieces included in each article information display object are displayed in a markup balloon corresponding to the article picking opening, but in actuality, the translucent display unit 11 displays an article information display object including those numbers by superimposing the article information display object onto the article picking opening. The article information may be displayed in association with a storage space (and article picking opening thereof) storing each article. Specifically, the translucent display unit 11 may display the numbers of cases and pieces by superimposing the numbers onto the article picking opening, display the numbers in a markup balloon corresponding to each article picking opening as illustrated in FIG. 24, or display the numbers in association with the article picking opening by, for example, a leader line. The same holds true also for article information in the first to fifth embodiments.

Figure 22:
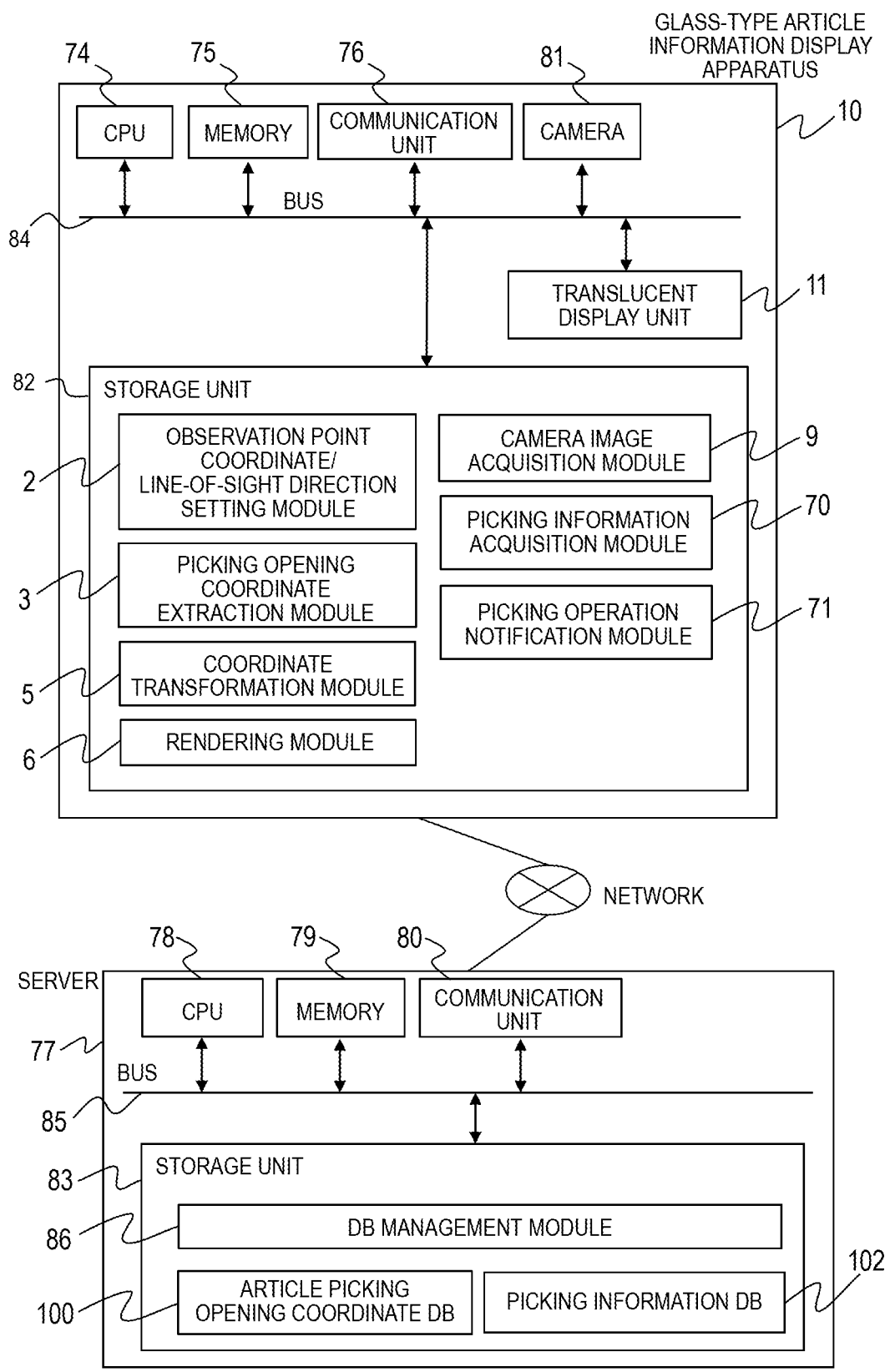
FIG. 22 is a block diagram for illustrating an example of a functional configuration of the glass-type article information display apparatus according to a sixth embodiment of this invention.

FIG. 22 is a block diagram for illustrating an example of a functional configuration of the glass-type article information display apparatus 10 according to the sixth embodiment of this invention.

Compared with the functional configuration of the third embodiment illustrated in FIG. 12, the article information collection module 4 is deleted from the glass-type article information display apparatus 10 according to the sixth embodiment, and the glass-type article information display apparatus 10 further includes a picking information acquisition module 70 and a picking operation notification module 71. Processing to be executed by the picking information acquisition module 70 and the picking operation notification module 71 is executed by the CPU 74 in accordance with a program code stored in the storage unit 82 in actuality. Further, compared with the functional configuration of the third embodiment illustrated in FIG. 12, the article information DB 101 is deleted from the server 77 in the sixth embodiment, and a picking information DB 102 is added to the server 77.

Figure 23:
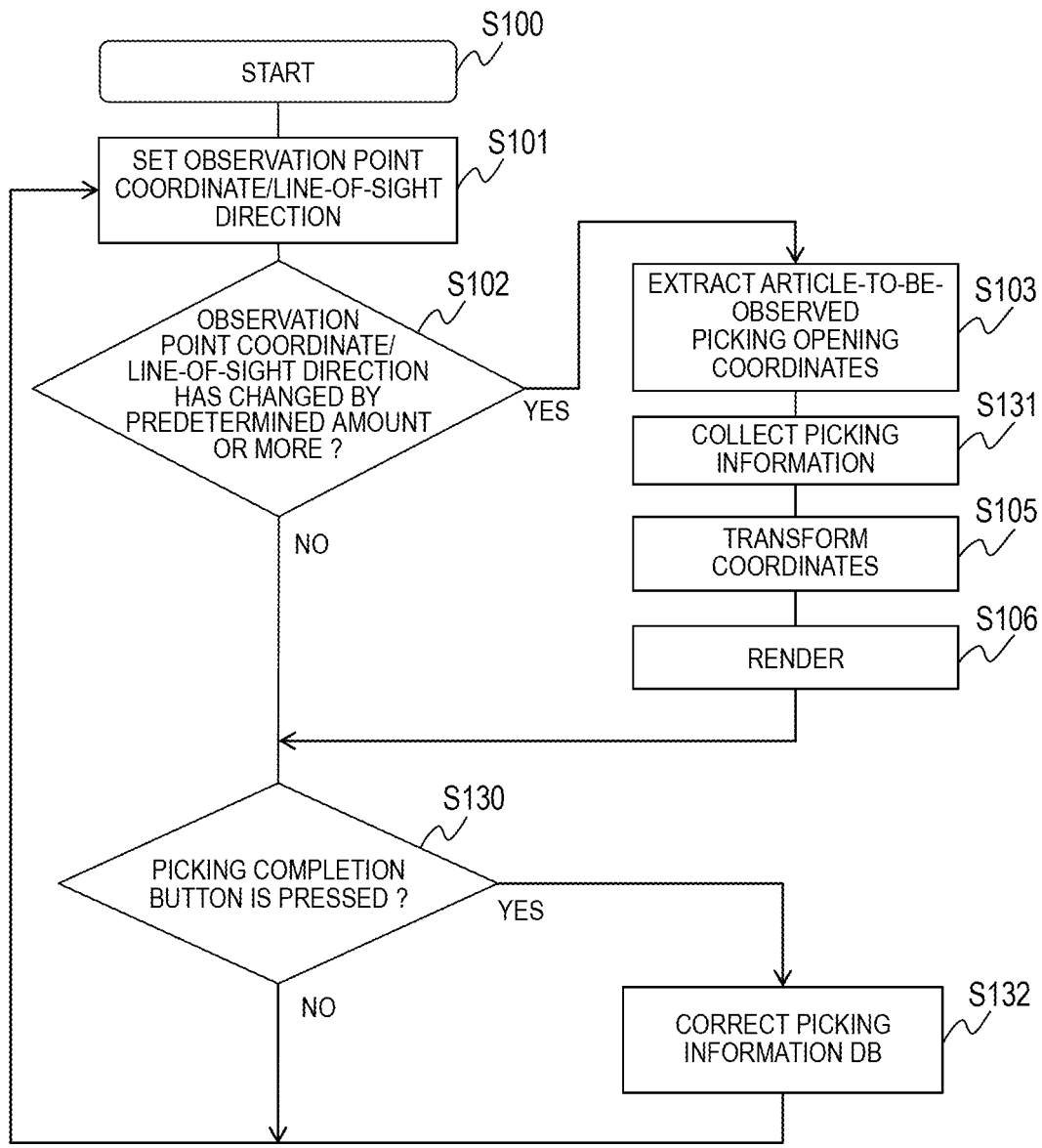
FIG. 23 is a flow chart for illustrating processing to be executed by the glass-type article information display apparatus according to the sixth embodiment of this invention.

FIG. 23 is a flow chart for illustrating processing to be executed by the glass-type article information display apparatus 10 according to the sixth embodiment of this invention.

The operations of from Step S100 to Step S106 in the sixth embodiment are the same as those of the third embodiment except that Step S104 is replaced by Step S131.

In a picking information collection sequence of Step S131, the picking information acquisition module 70 acquires at least picking information on the articles to be observed selected in Step S103 from the picking information DB 102, and holds the picking information in the storage unit 82. The acquired picking information includes the number of articles to be observed to be picked up, for example, the number of cases and the number of pieces. Then, the picking information acquisition module 70 selects an article to be picked up, which is planned to be picked up among the articles to be observed selected in Step S103, based on the acquired picking information. In the subsequent rendering sequence of Step S106, only the picking information on the selected article to be picked up is rendered.

The worker 8 selects and picks up the closest article to be picked up based on the image illustrated in FIG. 24, and presses the picking completion button 72 after the picking is finished. When pressing of the picking completion button is detected in Step S130, the picking operation notification module 71 corrects the picking information DB so that completion of the picking is reflected (Step S132), and the processing proceeds to Step S101. In the sixth embodiment, the picking completion button 72 is used to detect end of a picking operation, but the worker 8 may use, for example, a hand to perform a predetermined motion of exhibiting the end instead of the picking completion button 72, and the camera 81 may photograph the motion for image recognition and detect the motion. Alternatively, the worker 8 may cover the camera 81 with hands, and a change in amount of light input to the camera 81 may be used for detection. Alternatively, although not shown, an external device, for example, a small switch may be used for detection. Alternatively, the camera 81 or a small scanner (not shown) may be used to scan a barcode attached to a picked up article or a storage space to detect the end of work.

In the above-mentioned example, the glass-type article information display apparatus 10 is used, but in the sixth embodiment, the article information display apparatus 1 in any type can also be used similarly to the second embodiment, for example. In that case, the picking completion button 72 may be a so-called software key to be displayed on a touch panel, for example. The worker 8 can easily perform picking work with both hands by using the glass-type article information display apparatus 10.

With the sixth embodiment, in addition to the effect described in the third embodiment, an article to be picked up and the number thereof are superimposed onto the article picking opening of a real storage space for display, and the picking information DB is corrected in accordance with an operation of the picking completion button, to thereby be able to quickly recognize operation details to perform work, and reflect the result in the DB.

This invention is not limited to the above-mentioned embodiments, and encompasses various modification examples. For example, the above-mentioned embodiments have been described in detail for the better understanding of this invention, and this invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

Further, each of the components, functions, processing modules, processing means, and the like described above may be implemented partially or entirely by hardware by, for example, designing the components and the like as an integrated circuit. Each of the components, functions, and the like described above may also be implemented by software by interpreting and executing, with a processor, programs that implement the respective functions. The programs, tables, files, and other types of information for implementing the respective functions can be stored in a storage device such as a non-volatile semiconductor memory, a hard disk drive, or a solid state drive (SSD), or in a computer-readable non-transitory data storage medium such as an IC card, an SD card, or a DVD.

Further, control lines and information lines considered to be required for the sake of description are illustrated, and not all the control lines and information lines required in terms of product are illustrated. In actuality, almost all the components may be considered to be coupled to one another.

What is claimed is:

1. An article management support apparatus, comprising:
an observation point coordinate/observation direction setting module configured to set coordinates indicating a position of an observation point and an observation direction from the observation point in a space including a plurality of article storage spaces each for storing an article;
an article picking opening coordinate extraction module configured to acquire coordinates of an article picking opening of an article storage space within a predetermined range with respect to the position of the observation point and the observation direction;
an article information collection module configured to acquire information on the article stored in the article storage space corresponding to the article picking opening for which the coordinates are acquired;

a coordinate transformation module configured to transform the acquired coordinates of the article picking opening into coordinates on an image seen in the observation direction with respect to the position of the observation point;

a first rendering module configured to generate an image for displaying the information on the article stored in the article storage space corresponding to the article picking opening for which the coordinates are acquired in association with a position of the transformed coordinates;

a plan view creation module configured to generate the image on a plan view in the space including the plurality of article storage spaces, wherein the plan view creation module is configured to:
  generate the image in which the set position of the observation point and the set observation direction are displayed on the plan view; and
  generate, when an instruction to change the position of the observation point and the observation direction displayed on the plan view is input, the image in which the changed position of the observation point and the changed observation direction are displayed on the plan view, wherein the observation point coordinate/observation direction setting module is configured to change, when an instruction to change the position of the observation point and the observation direction displayed on the plan view is input, the set position of the observation point and the set observation direction in accordance with the instruction;

an assignment plan creation module configured to calculate an amount of work for articles stored in the plurality of article storage spaces based on arrangement of each of the plurality of article storage spaces, and select, as article exchange targets, the at least two article storage spaces so as to reduce the amount of work by exchanging the stored articles;
  wherein the assignment plan creation module is configured to
    select, when information instructing that any one of the plurality of article storage spaces is to be added as a calculation target is input, the at least two article storage spaces so as to include the any one of the plurality of article storage spaces instructed to be added as the calculation target, and
    select, when information instructing that any one of the plurality of article storage spaces is to be excluded from the calculation target is input, the at least two article storage spaces so as to exclude the any one of the plurality of article storage spaces instructed to be excluded from the calculation target, an instruction creation module configured to create an instruction to exchange articles stored in the at least two article storage spaces selected as the article exchange targets; and an article information updating module configured to update, when information indicating end of exchange of the articles that follows the instruction is input, information on the articles stored in the at least two article storage spaces so as to reflect the exchange of the articles;

a display unit configured to:
  display, when an instruction to display a plan view is input, the image on the plan view generated by the plan view creation module; and
  display, when an instruction to display a three-dimensional image is input, the image generated by the first rendering module.

2. The article management support apparatus according to claim 1, further comprising:
  a storage unit configured to hold marker information containing coordinates of at least one marker in the space and a characteristic of each of the at least one marker;
  a camera image acquisition module configured to acquire an image obtained by photographing any one of the at least one marker; and
  a marker detection module configured to detect the any one of the at least one marker from the image acquired by the camera image acquisition module based on the marker information, and to calculate a position and direction of a camera that has photographed the any one of the at least one marker,
  wherein the observation point coordinate/observation direction setting module is configured to set the position and direction of the camera that has photographed the any one of the at least one marker as the position of the observation point and the observation direction from the observation point, respectively.

3. The article management support apparatus according to claim 2,
  wherein the article management support apparatus is mounted on a head of a person,
  wherein the article management support apparatus further comprises a camera configured to photograph a front view of the person who wears the article management support apparatus,
  wherein the display unit comprises a translucent display screen, which is superimposed onto at least a part of a field of view of the person when the article management support apparatus is mounted on the head of the person,
  wherein the camera image acquisition module is configured to acquire an image photographed by the camera, and
  wherein the display unit is configured to display the image generated by the first rendering module by superimposing the image onto an actual article picking opening to be visually recognized by the person through the translucent display screen.

4. The article management support apparatus according to claim 1, wherein the article picking opening coordinate extraction module is configured to acquire, based on the coordinates of the article picking opening in the space, the article picking opening within a range defined by at least one of a distance from the position of the observation point or an angle of view with respect to the observation direction.

5. The article management support apparatus according to claim 1, further comprising a storage unit configured to hold information indicating arrangement of at least one rack including the plurality of article storage spaces,
  wherein the first rendering module is configured to generate the image so as to avoid displaying information on the article stored in the article storage space corresponding to, among article picking openings for which the coordinates are acquired, an article picking opening that is unable to be visually recognized because a line of sight from the position of the observation point is blocked by the at least one rack.

6. The article management support apparatus according to claim 1, further comprising:
 an article movement designation module configured to designate, as article exchange targets, at least two article storage spaces among the plurality of article storage spaces corresponding to the plurality of article picking openings for which information on the article is displayed;
 an instruction creation module configured to create an instruction to exchange articles stored in the at least two article storage spaces designated as the article exchange targets; and
 an article information updating module configured to update, when information indicating end of exchange of the articles that follows the instruction is input, information on the articles stored in the at least two article storage spaces so as to reflect the exchange of the articles.

7. The article management support apparatus according to claim 1, wherein the assignment plan creation module is configured to calculate one of a movement distance and a man-hour of a worker as the amount of work, based on a positional relationship between each of the plurality of article storage spaces and a shipping exit that is passed by an article stored in the each of the plurality of article storage spaces when the article is shipped.

8. The article management support apparatus according to claim 1,
 wherein the information on the article contains at least one value of a shipping frequency of the article, a storage period of the article, whether there is a stock of the article, whether there is a necessity for restocking the article, a period required for picking up the article, or a filling rate of the article storage space corresponding to the article, and
 wherein the first rendering module is configured to generate an image displaying one of a color, light and shade, and a character indicating a value of the information on the article.

9. The article management support apparatus according to claim 1, wherein the information on the article contains a number of articles to be picked up.

10. The article management support apparatus according to claim 9, further comprising:
 a picking completion input module configured to receive input of information indicating completion of picking based on the displayed information on the article; and
 a picking operation notification module configured to correct picking information indicating the number of articles to be picked up, based on the information indicating completion of picking.

11. An article management support system, comprising:
 a storage unit configured to hold article picking opening information containing coordinate information on article picking openings of a plurality of article storage spaces each for storing an article, and article information containing information on the article stored in each of the plurality of article storage spaces;
 an observation point coordinate/observation direction setting module configured to set coordinates indicating a position of an observation point and an observation direction from the observation point in a space including the plurality of article storage spaces;
 an article picking opening coordinate extraction module configured to acquire, based on the article picking opening information, coordinates of an article picking opening within a predetermined range with respect to the position of the observation point and the observation direction;
 an article information collection module configured to acquire, based on the article information, information on the article stored in an article storage space corresponding to the article picking opening for which the coordinates are acquired;
 a coordinate transformation module configured to transform the acquired coordinates of the article picking opening into coordinates on an image seen in the observation direction with respect to the position of the observation point;
 a first rendering module configured to generate an image for displaying the information on the article stored in the article storage space corresponding to the article picking opening for which the coordinates are acquired in association with a position of the transformed coordinates;
 a plan view creation module configured to generate the image on a plan view in the space including the plurality of article storage spaces,
 wherein the plan view creation module is configured to:
  generate the image in which the set position of the observation point and the set observation direction are displayed on the plan view; and
  generate, when an instruction to change the position of the observation point and the observation direction displayed on the plan view is input, the image in which the changed position of the observation point and the changed observation direction are displayed on the plan view,
 wherein the observation point coordinate/observation direction setting module is configured to change, when an instruction to change the position of the observation point and the observation direction displayed on the plan view is input, the set position of the observation point and the set observation direction in accordance with the instruction;
 an assignment plan creation module configured to calculate an amount of work for articles stored in the plurality of article storage spaces based on arrangement of each of the plurality of article storage spaces, and select, as article exchange targets, the at least two article storage spaces so as to reduce the amount of work by exchanging the stored articles;
 wherein the assignment plan creation module is configured to
  select, when information instructing that any one of the plurality of article storage spaces is to be added as a calculation target is input, the at least two article storage spaces so as to include the any one of the plurality of article storage spaces instructed to be added as the calculation target, and
  select, when information instructing that any one of the plurality of article storage spaces is to be excluded from the calculation target is input, the at least two article storage spaces so as to exclude the any one of the plurality of article storage spaces instructed to be excluded from the calculation target,
 an instruction creation module configured to create an instruction to exchange articles stored in the at least two article storage spaces selected as the article exchange targets; and an article information updating module configured to update, when information indicating end of exchange of the articles that follows the instruction is input, information on the articles stored in the at least two article storage spaces so as to reflect the exchange of the articles;

a display unit configured to:
    display, when an instruction to display a plan view is input, the image on the plan view generated by the plan view creation module; and
    display, when an instruction to display a three-dimensional image is input, the image generated by the first rendering module.

12. An article management support method to be executed by an article management support system,
    the article management support system comprising a processor, a storage unit, and a display unit,
    the storage unit being configured to hold article picking opening information containing coordinate information on article picking openings of a plurality of article storage spaces each for storing an article, and article information containing information on the article stored in each of the plurality of article storage spaces,
    the article management support method comprising:
    an observation point coordinate/observation direction setting step of setting, by the processor, coordinates indicating a position of an observation point and an observation direction from the observation point in a space including the plurality of article storage spaces;
    an article picking opening coordinate extraction step of acquiring, by the processor, based on the article picking opening information, coordinates of an article picking opening within a predetermined range with respect to the position of the observation point and the observation direction;
    an article information collection step of acquiring, by the processor, based on the article information, information on the article stored in an article storage space corresponding to the article picking opening for which the coordinates are acquired;
    a coordinate transformation step of transforming, by the processor, the acquired coordinates of the article picking opening into coordinates on an image seen in the observation direction with respect to the position of the observation point;
    a first rendering step of generating, by the processor, an image for displaying the information on the article stored in the article storage space corresponding to the article picking opening for which the coordinates are acquired in association with a position of the transformed coordinates;
    a plan view creation step of generating, by the processor, the image on a plan view in the space including the plurality of article storage spaces; and
    a displaying step of displaying, by the display unit, the generated image,
    wherein the plan view creation step includes:
        a step of generating, by the processor, the image in which the set position of the observation point and the set observation direction are displayed on the plan view; and
        a step of generating, by the processor, when an instruction to change the position of the observation point and the observation direction displayed on the plan view is input, the image in which the changed position of the observation point and the changed observation direction are displayed on the plan view,
    wherein the observation point coordinate/observation direction setting step includes a step of changing, by the processor, when an instruction to change the position of the observation point and the observation direction displayed on the plan view is input, the set position of the observation point and the set observation direction in accordance with the instruction;
    an assignment plan creation module step of calculating, by the processor, an amount of work for articles stored in the plurality of article storage spaces based on arrangement of each of the plurality of article storage spaces, and select, as article exchange targets, the at least two article storage spaces so as to reduce the amount of work by exchanging the stored articles;
    wherein the assignment plan creation module step includes
        selecting, when information instructing that any one of the plurality of article storage spaces is to be added as a calculation target is input, the at least two article storage spaces so as to include the any one of the plurality of article storage spaces instructed to be added as the calculation target, and
        selecting, when information instructing that any one of the plurality of article storage spaces is to be excluded from the calculation target is input, the at least two article storage spaces so as to exclude the any one of the plurality of article storage spaces instructed to be excluded from the calculation target,
    an instruction creation module step of creating, by the processor, an instruction to exchange articles stored in the at least two article storage spaces selected as the article exchange targets; and
    an article information updating module step of updating, by the processor, when information indicating end of exchange of the articles that follows the instruction is input, information on the articles stored in the at least two article storage spaces so as to reflect the exchange of the articles;
    wherein the display unit is configured to:
        a step of displaying, by the display unit, when an instruction to display a plan view is input, the image on the plan view generated by the plan view creation step; and
        a step of displaying, by the display unit, when an instruction to display a three-dimensional image is input, the image generated by the first rendering step.

* * * * *